United States Patent
Chakraborty et al.

(10) Patent No.: US 8,402,401 B2
(45) Date of Patent: Mar. 19, 2013

(54) PROTECTION OF INTELLECTUAL PROPERTY CORES THROUGH A DESIGN FLOW

(75) Inventors: Rajat Subhra Chakraborty, West Bengal (IN); Seetharam Narasimhan, Cleveland, OH (US); Swarup Bhunia, Shaker Heights, OH (US)

(73) Assignee: Case Western University, Cleveland, OH (US)

( * ) Notice: Subject to any disclaimer, the term of this patent is extended or adjusted under 35 U.S.C. 154(b) by 0 days.

(21) Appl. No.: 12/942,675

(22) Filed: Nov. 9, 2010

(65) Prior Publication Data

US 2011/0113392 A1  May 12, 2011

Related U.S. Application Data

(60) Provisional application No. 61/259,446, filed on Nov. 9, 2009.

(51) Int. Cl.
*G06F 17/50* (2006.01)
*G06F 11/30* (2006.01)
*G06F 12/14* (2006.01)

(52) U.S. Cl. ........ 716/102; 716/110; 716/106; 713/189; 713/193

(58) Field of Classification Search ................ None
See application file for complete search history.

(56) References Cited

U.S. PATENT DOCUMENTS

| 7,107,567 B1 * | 9/2006 | LeBlanc .................... 716/106 |
| 7,409,652 B1 * | 8/2008 | Fox et al. ................... 716/106 |
| 7,454,323 B1 * | 11/2008 | Bain ........................... 703/13 |
| 7,844,937 B2 * | 11/2010 | Raman et al. ............... 716/104 |
| 2010/0318945 A1 * | 12/2010 | Koushanfar ................ 716/104 |

* cited by examiner

*Primary Examiner* — A. M. Thompson
(74) *Attorney, Agent, or Firm* — Tarolli, Sundheim, Covell & Tummino LLP

(57) ABSTRACT

One embodiment provides a method for protecting an integrated circuit chip design. The method can include storing in memory a circuit description of an integrated circuit core comprising a set of nodes and selecting a plurality of modification nodes from the set of nodes. A sequential structure can be inserted into the circuit description to provide a modified circuit description, the sequential structure utilizing the plurality of modification nodes as inputs. The modified circuit description can be stored in memory.

23 Claims, 20 Drawing Sheets

Original RTL

```
module alu_simple (CLK,reset,a,b,result);
input CLK, reset;
input a, b;
output reg [1:0] result;
reg count ;
always @(posedge CLK or posedge reset) begin
 // Simple Toggle flip-flop
 if (reset) count <= 1'b0;
 else count <= ~count;
end
always @(count)
case(count)
 1'b0: result <= a+b;
 1'b1: result <= a-b;
endcase
endmodule
```
170

Obfuscated RTL

```
module circuit ( CLK, reset, a, b, result );
input CLK, reset, a, b;
output [1:0] result;
reg state_0,state_1,n17,n23;
wire N2,n7,n15,n16,n18,n19,n20,n21,n22;
assign n7=~(reset);
assign n21=~((~(state_1&(~(n15&(~(a...
 &(~(b))))))))&(~(state_0&(~((~(b))|a)))));
assign n22=~(~((~(a|(~((~(b))&n15))))&n16))...
 &(~(state_1&(~(n15&(~(a&(~(b))))))));
assign n20=~n19|(~((~((~(b))&n15))|(~(state_1&a))));
assign N2=~(n23);
assign n15=~(state_0);
assign n16=~(state_1);
assign n19=~(n17);
assign result[0]=~(~((~((~(n19&n23))...
 &(~((~(reset|n23))&n17))))&(~(n23))))...
 &(~((~((~((~(b))|a)))&(~(a&(~(b)))))))...
 &(~((~((~((~(n19&n23))&(~((~(reset|n23))...
 &n17))))))&n23))));
assign result[1]=~((~((~((~(b))|a))&n23))...
 &(~((~((~(a&(~((~((~(n19&n23))&...
 (~((~(reset|n23))&n17)))))))))&b)));
always @(posedge CLK or negedge n7) begin
 if (!n7) begin
  n23<=1'b0; state_0<=1'b0; state_1<=1'b0; n17<=1'b1;
 else begin
  state_0<=n22; state_1<=n21; n23<=N2; n17<=n20;
 end
end
endmodule
```
172

FIG. 8

1: /*Choose $q$ Trojan trigger nodes*/
2: Generate set of random vectors V
3: Simulate circuit using V to find set of nodes $N_\theta \subset N$ with signal probability $p < \theta$
4: Choose $q$ random nodes from the set $N_\theta$ as trigger nodes in set $N_{trigger}$
5: Find $S_{tr}$ rarest $q$-bit logic value combinations for the chosen nodes as Trojan state transition conditions
6: Fill-up Trojan template
7: /*Choose $M$ Trojan payload nodes*/
8: for all node $n \in N$ do
9:     Enumerate fanin cone in set ($FI_n$)
10:     Enumerate fanout cone in set ($FO_n$)
11: end for
12: $I_{max} \leftarrow max(|FI_n|)$
13: $O_{max} \leftarrow max(|FO_n|)$
14: for all node $n \in N$ do
15: Calculate metric $P_n \leftarrow 0.5 \times \dfrac{|FI_n|}{I_{max}} + 0.5 \times \dfrac{|FO_n|}{O_{max}}$
16: end for
17: Sort set N based on metric array $P_n$ in descending order
18: $N_{payload} \leftarrow \Phi$ /*the set of payload nodes*/
19: while $|N_{payload}| < M$ do
20:     Choose top ranked node $n \in N$
21:     Eliminate node n from set N
22:     If $FO_n \cap N_{trigger} = \Phi$ then
23:     /*Add this node to the existing set of payload nodes*/
24:     $N_{payload} \leftarrow N_{payload} \cup n$
25:     end if
26: end while
27: "Stitch" Trojan module with its trigger and payload nodes

```
module ex (clk,rst,in1,in2,res1,res2);
input clk, rst;
input [11:0] in1, in2;
output [11:0] res1;
output [23:0] res2;

reg [11:0] res1;
wire [23:0] res2;
reg [11:0] int_reg1, int_reg2;

assign res2 = (in1 + in2) * (in1 - in2);

always @(posedge clk or negedge rst) begin
    if (!rst) res1 <= 12'b0;
    else res1 <= int_reg1 ^ int_reg2;
end always @(posedge clk or negedge rst) begin
    if (!rst) int_reg1 <= 12'b0;
    else
        int_reg1
            <= (int_reg2==12'hddd & in1==12'h9ef) ? 12'hbbb
             : (int_reg2==12'h111 & in2==12'ha65) ? 12'h456
             : (int_reg2==12'haaa & in1==12'hbcd) ? 12'hccc
             : in1^in2;
end always @(posedge clk or negedge rst) begin
    if (!rst)
        int_reg2 <= 12'b0;
    else
        int_reg2
            <= (int_reg1==12'hbbb & in1==12'ha0b) ? 12'hddd
             : (int_reg1==12'h456 & in2==12'ha65) ? 12'h111
             : (int_reg1==12'hccc & in1==12'hcef) ? 12'haaa
             : in1|in2;
end
endmodule
```

580

```
module ex (clk,rst,in1,in2,res1,res2);
input clk, rst;
input [11:0] in1, in2;
output [11:0] res1;
output [23:0] res2;

reg [11:0] res1;
wire [23:0] res2;
reg [13:0] int_reg1;
reg [13:0] int_reg2;

assign res2 = (int_reg1==14'h1111 | int_reg2==14'h2123 | int_reg1==14'h0111
               | int_reg2==14'h0222) ? (in1+in2)*(in1-in2);

always @(posedge clk or negedge rst) begin
    if (!rst) begin
        res1 <= 12'b0;
        int_reg1 <= 14'b0;
        int_reg2 <= 14'b0;
    end
    else begin
        res1 <= int_reg1[11:0] ^ (int_reg2 & (int_reg1==14'h3111));
        int_reg1 <= ((int_reg2==14'h1ddd | int_reg2==14'h3ddd) & in1==12'h9ef) ? 14'h2bbb
                  : ((int_reg2==14'h0222 | int_reg2==14'h2222) & in1==12'hacc) ? 14'h0bbb
                  : ((int_reg2==14'h2123 | int_reg2==14'h0123) & in2==12'h222) ? 14'h0111
                  : ((int_reg2==14'h3111 | int_reg2==14'h1111) & in2==12'ha65) ? 14'h2456
                  : ((int_reg2==14'h1aaa | int_reg2==14'h3aaa)& in1==12'habb) ? 14'h2ccc
                  : ((int_reg2==14'h2c87 | int_reg2==14'h0c87) & in1==12'hbcd) ? 14'h0ccc
                     (&in1) ? {2'b10,in1^in2}         : {2'b11,in1^in2};
        int_reg2 <= (int_reg1==14'h2bbb | int_reg1==14'h3bbb) & in1==12'ha0b) ? 14'h3ddd
                  : ((int_reg1==14'h0000 | int_reg1==14'h0cde) & in1==12'h654) ? 14'h2123
                  : ((int_reg1==14'h1111 | int_reg1==14'h0111) & in1==12'h333) ? 14'h0222
                  : ((int_reg1==14'h2456 | int_reg1==14'h3456) & in2==12'ha65) ? 14'h3111
                  : ((int_reg1==14'h0ccc | int_reg1==14'h2ccc) & in1==12'hcef) ? 14'h1aaa
                  : ((int_reg1==14'h1bbb | int_reg1==14'h0bbb) & in1==12'h9ab) ? 14'h1000
                     (^in1) ? {2'b01,in1^in2}         : {2'b11,in1|in2};
    end
end
endmodule
```

FIG. 24

PROTECTION OF INTELLECTUAL PROPERTY CORES THROUGH A DESIGN FLOW

CROSS-REFERENCE TO RELATED APPLICATIONS

This application claims the benefit of U.S. Provisional Patent Application No. 61/259,446, which was filed Nov. 9, 2009, and entitled HARDWARE IP PROTECTION AT DIFFERENT LEVELS OF DESIGN ABSTRACTIONS, the entire contents of which is incorporated herein by reference.

TECHNICAL FIELD

The present invention relates generally to protection of intellectual property (IP) such as IP cores.

BACKGROUND

The aim of integrating more and more functionality in a single integrated circuit (IC) has resulted in a fast and inevitable increase in System-on-Chip (SoC) design complexity. In this scenario, reuse-based design using hardware Intellectual Property (IP) cores has become extremely common. These IP cores are usually in the form of synthesizable Register-Transfer Level (RTL) descriptions in Hardware Description Languages (HDLs), or gate-level designs directly implementable in hardware. This approach of designing complex systems by integrating tested and verified, smaller and reusable modules can help reduce the design cycle time dramatically. It is quite common to have SoC designs where multiple IPs from different IP vendors are integrated by the chip designer and ultimately multiple such chips are integrated by the system designer to build the desired system. Unfortunately, recent trends in IP-piracy and reverse-engineering efforts to produce counterfeit ICs have raised serious concerns in the IC design community.

SUMMARY

The invention relates generally to methods and to a system for protecting intellectual property such as IP Cores. The methods and systems can be implemented as part of a design flow for an integrated circuit (IC) that may utilize one or more IP cores as building blocks for the IC chip or a system incorporating one or more such ICs. One embodiment of the invention provides a method for protecting the IC design. A circuit description can be stored in memory in appropriate form such as a soft IP instance or a firm IP instance thereof. The instance of the circuit description comprises a set of nodes. The plurality of modification nodes are selected from a set of nodes of the circuit description. For example, the circuit description can be in a form of a register-transfer level (RTL) description, a gate-level netlist, or a control and data flow graph (CDFG) data structure for the corresponding circuit.

The method includes obfuscating the circuit design by inserting a sequential structure into the circuit description to provide a corresponding modified (i.e., obfuscated) version of the circuit description. The sequential structure can utilize modification nodes as inputs for use in generating corresponding outputs and implementing state transitions. The inserted sequential structure can be partially or wholly hosted within an existing structure (i.e., a register from the original circuit description) to improve the obfuscation thereof. Additionally, the sequential structure can be inserted to provide for both structural and functional and semantic obfuscation of the original circuit description. The modified circuit description can be stored in memory and be sent to users in a design flow such as for evaluation, fabrication and testing. A key can also be generated for controlling the obfuscated circuit design between an obfuscated mode and a normal operating mode. There can be multiple keys depending upon the manner and type of which obfuscation is being implemented. For example the obfuscation can be implemented as a Trojan that permits evaluation of the circuit description and corresponding circuitry for a probabilistically determined duration, after which it causes a pre-determined malfunction. Such Trojan can be disabled by another key, such as can be input to the primary inputs of the core.

As an alternative or additional example, the corresponding circuit description and associate corresponding circuitry can operate initially in the obfuscated mode at power up. In this way the original and normal operating function of the circuitry is disabled while in the obfuscated mode. In response to an authorized user inputting a corresponding initialization key the circuitry can change from the obfuscated mode to the normal operating mode. It will be understood and appreciated that one or more of such sequential structures can be inserted into a given circuit description and that the resulting modified design can be constrained according to user requirements such as the desired level of security and the increase in area or power requirements permissible by the designer.

As a further example, one embodiment provides a method for protecting an integrated circuit chip design. The method can include storing in memory a circuit description of an integrated circuit core comprising a set of nodes and selecting a plurality of modification nodes from the set of nodes. A sequential structure can be inserted into the circuit description to provide a modified circuit description, the sequential structure utilizing the plurality of modification nodes as inputs. The modified circuit description can be stored in memory.

BRIEF DESCRIPTION OF THE DRAWINGS

FIG. 8 depicts an example of an RTL circuit representation being transformed from an original description to an obfuscated version thereof.

FIG. 12 depicts an example approach for designing a Trojan for insertion into a circuit design.

FIG. 24 depicts an example of an original RTL being transformed to an obfuscated RTL.

DETAILED DESCRIPTION

Figure 1:
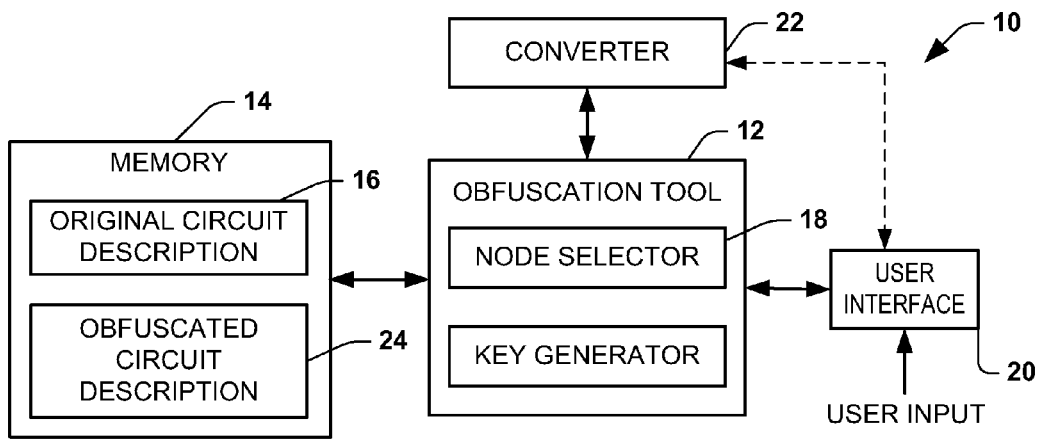
FIG. 1 depicts a block diagram of an example system for obfuscating a circuit design.

The invention relates generally to protecting an intellectual property (IP) core, such as used in a system on chip (SoC) device.

Embodiments described herein provide a complete method and corresponding design that can afford IP protection at all stages (including the evaluation phase) of the IP lifecycle. This can be achieved in one embodiment through the modification of the state transition function (e.g., corresponding to a finite state machine (FSM)) of a circuit description instance (e.g., firm IP, soft IP or a combination of modifications of firm and soft IP) corresponding to the IP design. One or more keys can also be provided for use with the obfuscated IP to selectively enable or disable an obfuscated mode of the circuit design. For example, the key can be generated as an initialization key that is applied at primary inputs to disable the obfuscated mode and/or to perform authentication, as mentioned above.

Alternatively, the key can correspond to a sequence of states at internal nodes that can operate as a Trojan. For instance, the Trojan can be implemented to represent a finite state machine (FSM) that goes through a sequence of state transitions caused by pre-identified rare events before activating to disable the circuit functionality of the designed or fabricated circuit. The timing of activation can thus be probabilistically set by selecting the sequence of transitions to allow evaluation of the design or circuit for a prescribed duration. Embodiments of the invention can be utilized to exploit the elusive nature of hardware Trojans via a gate-level IP (referred to herein as "firm IP") design technique that can avoid the requirement of IP encryption, evaluation in protected environment or extensive licensing agreement, and hence reduces the burden for both IC designers and IP vendors. The approach disclosed herein can also be implemented according to soft IP (e.g., register-transfer level (RTL)) design techniques.

The systems and methods can also be employed to embed a hard-to-remove "digital watermark" in the IP design that can help to authenticate the IP in case it is illegally stolen. The authentication capability comes at no additional hardware overhead and thus helps to reduce the overall design overhead, while providing additional security. Thus, those skilled in the art and those parties concerned with the SoC design and manufacturing flow, including the IP vendor, the IC designer and the system designer can benefit from the systems and methods described herein.

As will be appreciated by those skilled in the art, portions of the invention may be embodied as a method, data processing system, or computer program product. Accordingly, these portions of the present invention may take the form of an entirely hardware embodiment, an entirely machine-readable instruction embodiment, or an embodiment combining hardware and machine-readable instructions. Furthermore, portions of the invention may be a computer program product on a computer-usable storage medium having computer readable program code on the medium. Any suitable computer-readable medium may be utilized including, but not limited to, static and dynamic storage devices, hard disks, optical storage devices, solid state storage and magnetic storage devices.

Certain embodiments of the invention are described herein with reference to flowchart illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Turning to the figures, FIG. 1 depicts an example of a system 10 that can be used for protecting an IP or integrated circuit (IC) chip design, such as an IP core of a system on chip (SoC). The system 10 includes an obfuscation tool 12 that is configured for obfuscating a circuit design by inserting a sequential structure, such as a finite state machine (FSM) into the circuit description. The system 10 includes memory 14 in which an original circuit description 16 can be stored. The original circuit description 16 can represent an instance of the design, such as firm IP (e.g., gate level netlist) or soft IP (e.g., an RTL or other higher level designs including a control and data flow graph (CDFG)).

The obfuscation tool 12 can be implemented as computer-executable instructions running on a processor or a computer or workstation. The obfuscation tool 12 thus can include a variety of methods for performing the desired obfuscation relative to the original circuit description 16. The computer or workstation further can utilize other tools and methods for use in designing, converting and modifying the design.

It will be understood and appreciated that in addition to various formats and languages in which the original circuit description 16 can be stored in the memory 14, the original circuit description can exist in a variety of different phases of the design flow for the circuit. For example, the original circuit description 16 can be a previously verified unobfuscated version. Alternatively, the original circuit description 16 can correspond to a previously obfuscated version of the circuit description in which additional processing and obfuscation is to be performed. That is, the term "original" does not require that it be a first version of a given design, but instead is intended simply to differentiate between the condition that the design is accessed and its obfuscated output condition. The obfuscation tool 12 thus can access the circuit description 16 or portions thereof for obfuscation at any stage based on the teachings herein.

In the example of FIG. 1, the obfuscation tool 12 includes a node selector 18 that can be utilized to select a plurality of nodes from the original circuit description 16 and generate a corresponding subset of the nodes that can be utilized in conjunction with the obfuscation of the circuit design. For instance, the plurality of nodes being modified (e.g., referred to herein as modification nodes) can be utilized as inputs for the sequential structure such as the FSM. The nodes can be selected according to a ranking method (see, e.g., FIG. 3). The ranking of the nodes can be an iterative process in which multiple passes through the method are performed to result in a corresponding set of nodes. The number of nodes further can be determined according to user inputs and other constraints provided by the designer.

As an example, a designer can interact with the obfuscation tool 12 via a user interface 20. For instance, in response to the user inputs, a variety of input parameters and constraints, such as a maximum area constraint, a number of states to perform in the obfuscated mode, a length of a key sequence for enabling or disabling an obfuscation mode, or the like, can be established by the user through a user interface. Alternatively or additionally, default parameters can be utilized for performing the obfuscation method.

Once the corresponding nodes have been selected, the obfuscation tool 12 can modify the circuit description 16, which can include functional obfuscation, structural obfuscation and semantic obfuscation. The obfuscation can be performed on the circuit description at one or more different design levels. For instance, in one embodiment, the obfuscation can be performed on a gate-level netlist of the circuit description 16. Alternatively or additionally, the obfuscation can be performed on a RTL instance of the circuit description 16. As yet another alternative, the obfuscation can be performed on a CDFG data structure corresponding to the circuit description 16.

Those skilled in the art will understand and appreciate various types of converters 22 that can be utilized to transform the circuit description 16 among such various different levels thereof to facilitate the modification of the circuit description. The user interface 20 can thus be utilized to access the converter 22 for converting the original and/or obfuscated circuit description 24 to a corresponding different form, such as described herein. The obfuscation tool 12 can also be programmed to include or access other methods for flattening the resulting obfuscated design, which flattening can further increase the level of obfuscation being performed. The obfuscation tool 12 in turn can generate the obfuscated circuit description 24 which can be stored in the memory 14.

Figure 2:
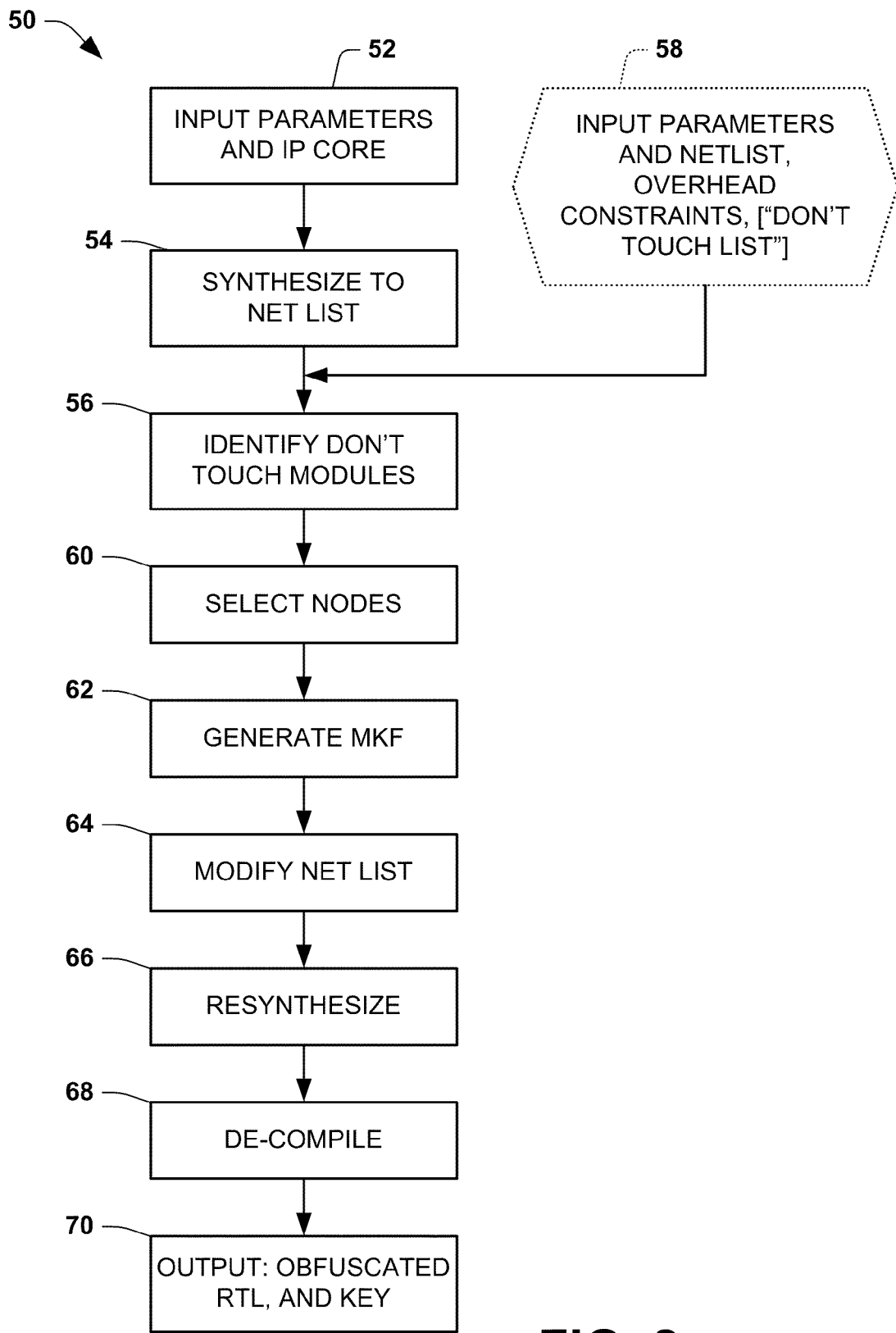
FIG. 2 is a flow diagram depicting an example gate-level obfuscation method.

As a further example, FIG. 2 depicts a method 50 for protecting an IP core. The method 50 begins at 52 by providing input parameters and a circuit description for the IP core to be obfuscated. The input parameters can also define a maximum allowable area overhead, which can be entered by a designer as a design constraint, from which the maximum number of modifiable nodes ($N_{max}$) can be estimated. In the example of FIG. 2, the circuit description can be a soft IP description, such as the RTL description of the IP core. At 54, the soft IP circuit description (e.g., RTL) can be synthesized to a firm-IP version, such as a gate-level netlist (e.g., a Verilog netlist).

At 56, modules can be identified as "don't touch" modules, such as according to a list of user-defined modules, which if found in the gate-level netlist, are treated as don't touch modules (e.g., excluded from modification). The user input parameters can also specify a number of nodes $N_{out}$ to modify in the method 50. For instance, $N_{out}$ can be either user-specified or set to be equal to $N_{max}$. While the example of FIG. 2 shows a circuit description being synthesized to the netlist version, it will be appreciated that the netlist version can be alternatively provided as the input circuit description along with the input parameters, as indicated at 58.

At 60, the nodes in the netlist circuit description are ranked. For example, the nodes in the netlist can be dynamically ranked to choose $N_{max}$ most suitable nodes for modification and modified node are eliminated. The ranking of the nodes can be performed as an iterative process that can account for fan-in characteristics and/or fan-out characteristics of the respective nodes in the netlist. An appropriate node selection metric can also be defined. A further example of a node ranking method is demonstrated with respect to FIG. 6.

By way of example, a hacker trying to determine the functionality of an obfuscated RTL IP core can take resort to either (1) simulation-based reverse-engineering to determine functionality of the design, or (2) structural analysis of the synthesized RTL to identify and isolate the original design from the obfuscated design. The proposed obfuscation approach targets simulation mismatch between the obfuscated design and the original design for the maximum possible number of input vectors.

Figure 3:
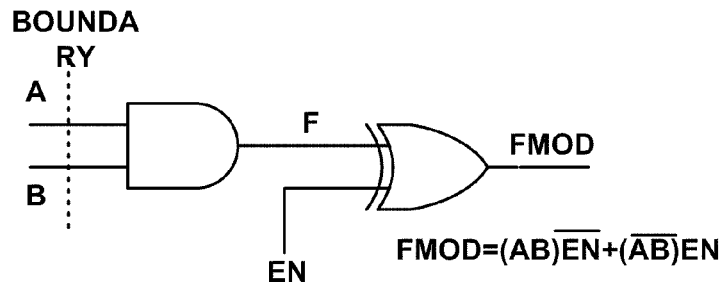
FIG. 3 depicts an example of logic depicting gate-level obfuscation.

The example of FIG. 3 depicts a modified 2-input AND gate. If en=0, the AND gate functions as an ordinary AND gate. However, if en=1, the original functionality of the AND gate is obfuscated because the output is inverted. This method can be extended to the gate level design using an internally generated en signal which will cause the modified design to behave functionally differently from the original design under certain conditions.

Figure 4:
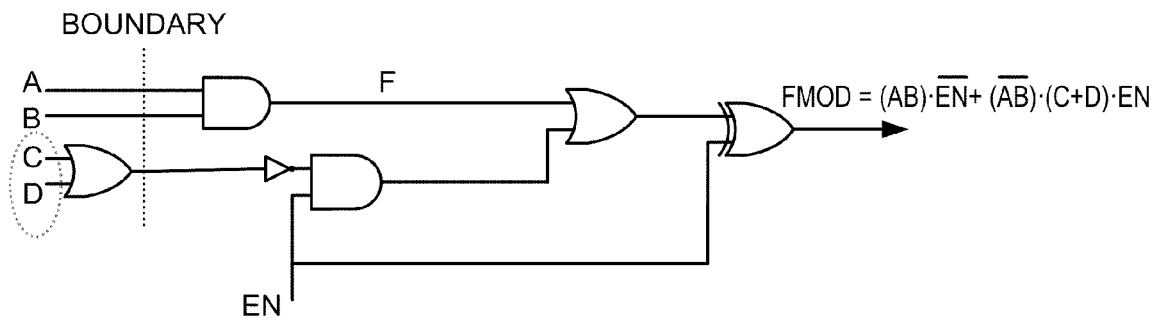
FIG. 4 depicts an example of logic depicting gate-level obfuscation with a cone expansion modification.

The simple circuit of FIG. 3 against an ordinary 2-input AND gate will report 4 possible input vectors with en=1 as failing patterns. To increase the number of failing patterns for this circuit we must increase its input logic cone size, all the while ensuring that it continues to function properly when en=0. FIG. 4 shows an alternative scheme, where the input logic cone has been expanded to include the nodes c and d. This modified circuit is functionally non-equivalent to a&b for 13 input patterns if en=1. The modification scheme of FIG. 4 can be generalized as a modification cell, such as demonstrated in the example of FIG. 5.

Figure 5:
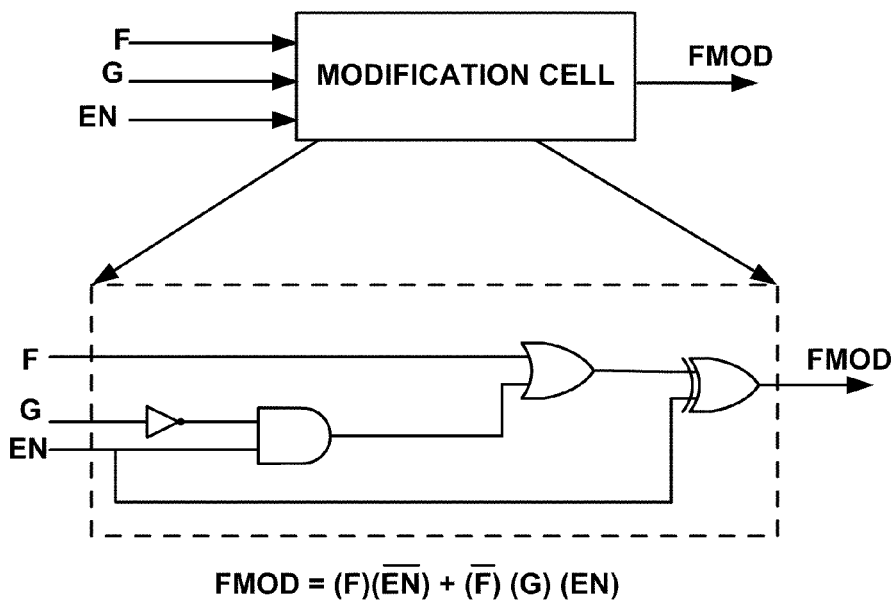
FIG. 5 depicts an example of a gate-level obfuscation modification cell.

In the example of FIG. 5, f is the Boolean function corresponding to an internal node and g is any arbitrary Boolean logic function. As shown, the modified logic function is of the form:

$$f_{mod} = f \cdot en' + f \cdot g \cdot en \qquad \text{Eq. 1}$$

Returning to FIG. 2, at 62 the function g can be generated or selected as a Modification Kernel Function (MKF) from the nodes ranked at 60. From Eq. 1, it is evident that that for en=1, g should evaluate to logic-1 as often as possible to cause more failing test patterns, and this is ensured if g is the logical-OR of its inputs. In the derivation that follows, g is assumed to be an OR-function of its inputs.

As a further example, let P be the set of all primary inputs and state element outputs. Let $P_1 \subset P$ be the set of primary inputs and $P_2 \subset P$ be a set of some primary inputs and state element outputs. Let f be a function of the nodes in $P_1$ and g be a function of the nodes in $P_2$. Let $P_1 \cap P_2 = P$, $|P_1| = p_1$, $|P_2| = p_2$, $|P| = p$, and $P_1 \cup P_2 = \Gamma$ and $|\Gamma| = p_1 + p_2 - p = \gamma$. Further, in this example, let g be a Boolean OR function with $p_2$ inputs. Then, for $(2^{P_2} - 1)$ of its input combinations, g is at logic-1. Consider en=1. Then, for all these $(2^{P_2} - 1)$ input combinations of $P_2$, $f_{mod} = f$, causing a failing vector. Corresponding to each of these $(2^{P_2} - 1)$ combinations of $P_2$, there are $(p_1 - p)$ other independent primary inputs to f. Hence, the total number of failing vectors when g=1 is:

$$N_{g1} = 2^{(p_1 - p)} \cdot (2^{p_2} - 1) \qquad \text{Eq. 2}$$

For the other "all zero" input combinations of $P_2$, f=0. Let the number of possible cases where f=1 at g=0 be $N_{g0}$. Then, the total number of failing input patterns:

$$N_{failing} = N_{g1} + N_{g0} = 2^{(p_1 - p)} \cdot (2^{p_2} - 1) + N_{g0} \qquad \text{Eq. 3}$$

In the special case when $P_1 \cap P_2 = P = \phi$, $N_{g0}$ is given simply by the number of possible logic-1 entries in the truth-table of f. The total input space of the modified function has a size $2^\gamma$. We define the functional obfuscation metric ($M_{func}$) as $$M_{func} = \frac{N_{failing}}{2^{\gamma + 1}} = \frac{2^{(p_1 - p)} \cdot (2^{p_2} - 1) + N_{g0}}{2^{p_1 + p_2 - p + 1}} \qquad \text{Eq. 4}$$

The "+1" factor in the denominator is due to the en signal. Note that $$0 < M_{func} \le \frac{1}{2}$$

As an example, the logic function f=ab+cd with g=a+b has $M_{func}$ 13/32.

From the foregoing, it can be shown that having a g with p=0 maximizes $M_{func}$ for most Boolean functions. However, in practice, this could incur a lot of hardware overhead to generate the OR-functions corresponding to each modified node. Alternatively, a different approach is to select an internal logic node of the netlist to provide the Boolean function g. Such internal logic node should have a have very large fan-in cone to substantially expand the logic cone of the modified node. Also, nodes in "combinational loops" should remain unmodified. Although g in this approach is not guaranteed to be an OR-function and is thus theoretically sub-optimal, this approach is attractive because of its low design overhead.

At 64, the netlist is modified. The modifications can be performed for the chosen nodes, such as using the modification cell of FIG. 5, using a suitable MKF and any one of the $N_{out}$ outputs of the inserted FSM chosen randomly. Boolean functions of the inserted FSM can be generated randomly. As an example, the state encoding of the inserted FSM can be performed using a commercially available state encoding tool, such as STAMINA.

After all the structural gate-level modifications have been completed to achieve functional obfuscation, at 66, the modified netlist can be re-synthesized as part of implementing further semantic obfuscation. The re-synthesis can be implemented to "flatten" the modification cells and the state transition logic for inserted state elements. This process also allows logic sharing between the original circuit, modification cells and inserted state transition logic, which enhances the obfuscation.

At 68, the re-synthesized netlist can be then decompiled to a corresponding RTL (e.g., Verilog RTL). As part of the decompilation of the synthesized netlist representation, redundant internal nodes can be eliminated. An example of the decompile process is demonstrated herein with respect to FIG. 7.

At 70, an obfuscated RTL representation of the circuit design and a corresponding key can be output and stored in memory. The nature of the key can depend on the type and manner of obfuscation implemented by modifying the netlist (at 64). For instance, the key can correspond to an initialization key sequence that is required to enable normal operation only upon application of a specific input key sequence.

Alternatively or additionally, the modifications at 64 can be utilized to insert a sequential structure that operates as a conditionally triggerable hardware Trojan, which ensure that the IP cannot be used illegally by an IC design house in a product. For instance, the Trojan is triggered (e.g., corresponding to entering the obfuscation mode) after a duration based on a predetermined state transition sequence occurring at selected subset of internal nodes, which duration can be probabilistically determined. This duration can be set to provide an IC designer sufficient opportunity to evaluate the IP. The Trojan can be disabled by the application of a different deactivation key so as to operate in its normal operating mode. This disabling key can be provided to an IC designer who purchases the IP after evaluation. This design technique gives the IC designer the freedom to evaluate the fully functional evaluation version using the preferred set of design automation tools, while protecting the rights of the IP vendor. Advantageously, the evaluation can proceed without requiring a license or otherwise entering into an evaluation agreement since the IP will be permanently disabled after the duration. Moreover, since the duration is probabilistically determined based on analysis of internal inputs, the Trojan is hidden from detection.

Additionally or alternatively, the modification to the netlist at 64 can also be implemented such that the obfuscation used to insert the sequential structure also embeds a digital watermark in the IP to facilitate authentication of the IP. In contrast to many other approaches, the systems and methods disclosed herein provide much greater resistance to reverse-engineering because the security features (e.g., FSM) form an integral and indistinguishable part of the modified design. The FSM can be configured to provide a particular pattern to appear at a sub-set of the primary outputs when a particular input vector is applied at a small subset of the primary inputs. Even if a hacker arranges to by-pass the initialization stage by structural modifications, because of the prevalent widespread use of full-scan designs, the inserted FSM structure can always be controlled for authentication.

Figure 6:
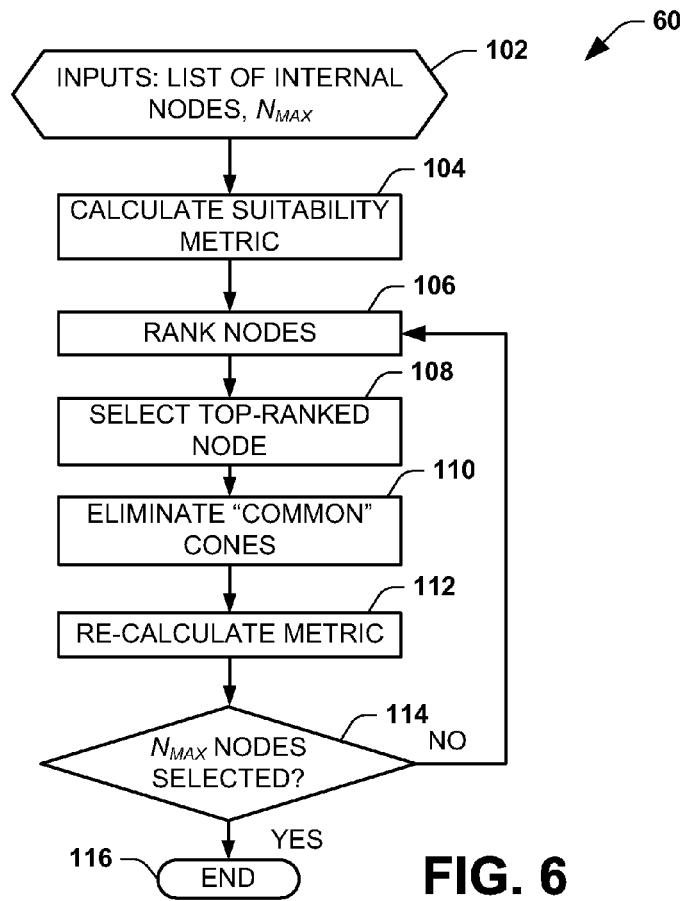
FIG. 6 is a flow diagram depicting an example method for selecting nodes from a circuit description.

FIG. 6 depicts an example of a method 60 that can be utilized to select a subset of nodes, such as corresponding to action 60 in FIG. 2. The method 60 begins at 102 with the input of a list of internal nodes for the circuit design (e.g., from the netlist) and input parameters. Ideally, to obfuscate a design, one would like to modify as many nodes in the original implementation as possible. However, that is practically impossible because of various design constraints such as area, power and timing. Accordingly, a maximum number of nodes ($N_{max}$) can be defined by a user or determined from other constraints, such as according to a maximum area, timing or power requirements.

At 104, a suitability metric is calculated. The suitability metric can quantify the desirability of using a node in the obfuscation method (e.g., method 50 of FIG. 2). The suitability metric can consider the fan-out and fan-in characteristics of each node. For instance, any modification at a node that has a large output logic cone would be preferred over any modification at a node with smaller logic cone, because this will cause changes in the input logic cones of a comparatively larger number of nodes. Similarly, a large input logic cone of a node is generally indicative of the logic depth of the node; hence, any change at the node is likely to potentially alter a large number of primary outputs. Thus, in determining the suitability metric for a node before choosing it, the calculation of the suitability metric can consider these factors. An example of a suitability metric $M_{node}$ for a given node can be expressed as follows:

$$M_{node} = \left(\frac{w_1 \cdot FO}{FO_{max}} + \frac{w_2 \cdot FI}{FI_{max}}\right) * \frac{FO \cdot FI}{FI_{max} \cdot FO_{max}} \qquad \text{Eq. 5}$$

where
FI is the number of nodes in the fan-in cone of the node,
FO is the number of nodes in the fan-out cone of the node,
FImax and FOmax is the maximum number of fan-in and fan-out nodes in the circuit netlist, respectively, and are used to normalize the metric; and
$w_1$ and $w_2$ are weights assigned to the two factors, with $0 < w_1, w_2 \leq 1$ and $w_1 + w_2 = 1$.

As an example, $w_1 = w_2 = 0.5$, which has been determined to be effective. Although other weight values can be utilized. Note that $0 < M_{node} \leq 1$. Because of the widely differing values of $FO_{max}$ and $FI_{max}$, the suitability metric of Eq. 5 can consider both the sum and the product terms involving $$\frac{FO}{FO_{max}} \text{ and } \frac{FI}{FI_{max}}.$$

Considering only the sum term or only the product term may result in an inferior metric that fails to capture the actual suitability of a node.

Once the metric has been calculated for the nodes in a gate level design, at 106, the nodes are ranked. The ranking at 106 can be performed as an iterative ranking process (e.g., demonstrated at 106 to 114). For example, the ranking can be implemented as a multi-pass algorithm, with the metric for each node being dynamically modified based on the selection of the node in the last iteration. The iterative ranking process can take into account the overlap of the fan-out cones of the nodes which have been already selected and eliminate them from the fan-out cones of the remaining nodes. On the completion of each iterative ranking at 106, the top ranking node among the remaining nodes can be selected at 108, such that selection of $N_{max}$ nodes would take $N_{max}$ iterations. In this way, as the iterations progress, the nodes with more non-overlapping fan-out cones are assigned higher weight. At 110, common cones in fan-out cones for nodes that have already been selected can be eliminated to avoid duplicating counts of nodes in a given fan-out. At 112, the suitability metric (e.g., the metric of Eq. 5) is recalculated for the current iteration.

At 114, a determination is made as to whether the maximum number of nodes $N_{max}$ has been selected. If the determination is negative, the method returns to 106 to rank the metric for each of the nodes. Once it has been determined at 114 that the maximum number of nodes $N_{max}$ has been selected, the method can end at 116. It will be appreciated that the iterative approach for selecting nodes in the example of FIG. 6 seems to yield superior results relative to a single-pass ranking.

Figure 7:
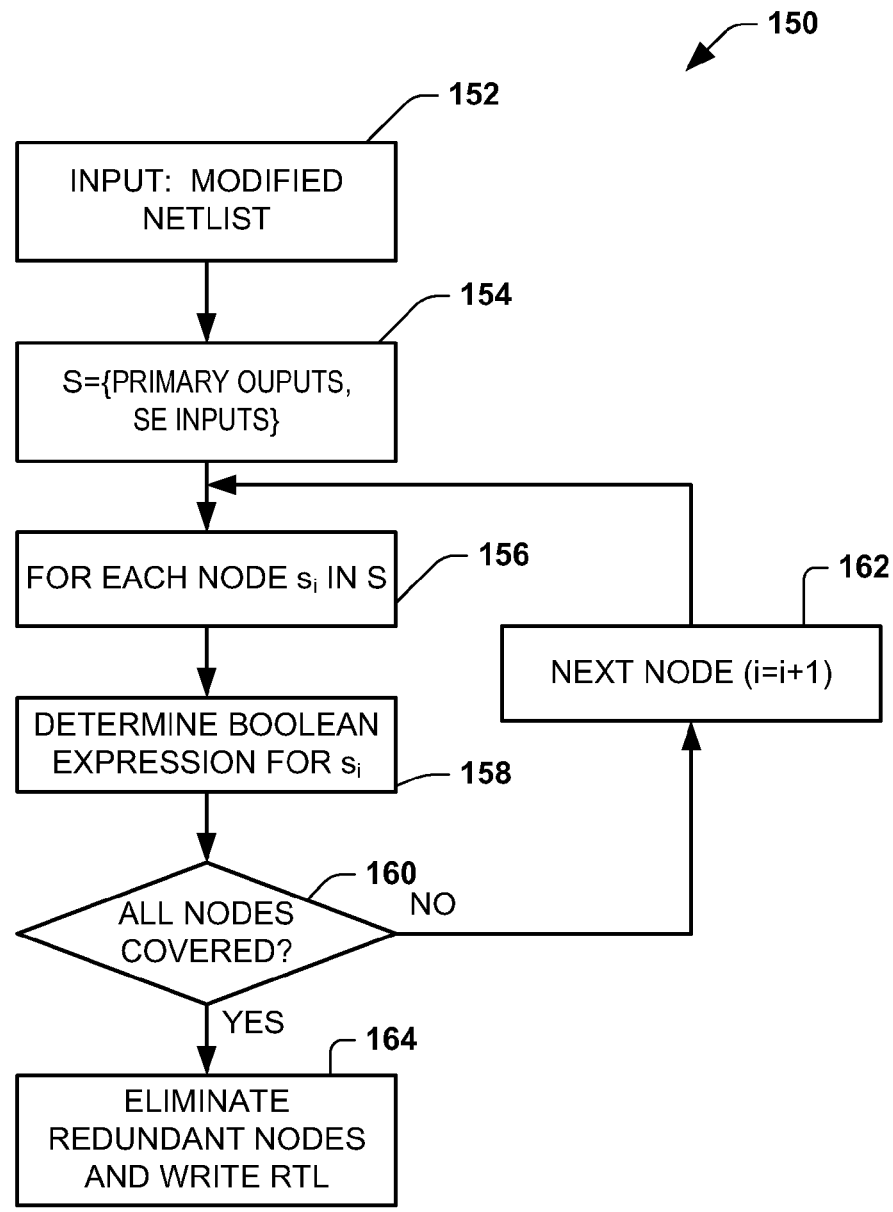
FIG. 7 is a flow diagram depicting an example method for decompiling a circuit description to provide a corresponding RTL instance.

FIG. 7 depicts an example of a method 68 that can be used to decompile to an RTL representation, such as corresponding to action 68 in FIG. 2 following re-synthesis. The method 68 can be performed to regenerate the RTL of the code, without maintaining high level HDL constructs. At 152, the modified netlist is provided as an input to the method 68. For instance, the modified netlist can be a description of an unmapped, unoptimized gate-level Verilog netlist. At 154, the states (S) of the FSM are defined as a function of a set of primary outputs and inputs to the state elements (SE) in the modified netlist. For instance, a forward annotation file can be used to indicate relevant high-level HDL constructs and macros to be preserved through the transformation process. These are maintained during the RTL compilation and decompilation steps. From the unmapped gate-level netlist, we look for specific generic gates, that can be decompiled to an equivalent RTL construct, e.g. a multiplexor can be mapped to an equivalent 'if . . . then . . . else' construct. The datapath modules or macros can also be transformed into appropriate operands.

At, 156 a recursive processing for each node $s_i$ begins. Thus, at 158, Boolean expression for a given node $s_i$ is determined. For instance, the modified netlist is traversed recursively for the node $s_i$ to re-construct the Boolean equations for the primary outputs and the state element inputs, which can be expressed in terms of the primary inputs, the state-element outputs and a few selected high fan-out internal nodes.

At 160 a determination is made if all nodes in the modified netlist have been covered as part of the recursive processing. If all nodes have not been covered, the method proceeds to 162 to process the next node $d_{i+1}$. From 162 the process is repeated for the next node including determining a corresponding Boolean expression. Once all nodes have been determined to be covered, from 160 the method can proceed to 164.

At 164, the redundant internal nodes are removed. The resulting RTL representation is written and can be stored in memory. This "partial flattening" effect hides all information about the modifications performed in the netlist. Once the logic equations are formed, specific signature in the equation is searched to map it to a suitable RTL construct. For example, an equation $n1 = s1 \cdot d1 + s2 \cdot d2 + s3 \cdot d3$ can be mapped to a CASE construct.

As a further example, the obfuscation tool (e.g., the tool 12 from FIG. 1) maintains a list of expected instances of library datapath elements, and whenever these are encountered in the netlist, their outputs are related through proper RTL constructs to their inputs. This helps to ensure re-generation of the same datapath cells on re-synthesis of the RTL. As an example, consider a simple Verilog module "alu_simple" which performs addition or subtraction of two bits depending on the value of a free running toggle flip-flop and its obfuscated version, such as shown in FIG. 8. FIG. 8 demonstrates an original RTL representation 170 and modified RTL representation 172 following obfuscation. It is evident that the modification cell and the inserted FSM logic are indistinguishable from the rest of the design. The net semantic effect of obfuscation is the replacement of high level RTL constructs (such as if . . . else, for, while, case, assign, or the like) and redundant internal wires from the original RTL by reg, assign and wire declarations in the obfuscated RTL. Also, additional state elements can be added to the obfuscated RTL, such as described herein.

A metric can be used to provide a quantifiable measure of semantic difference between two instances of RTL description (e.g., between the instances 170 and 172 of FIG. 8). As an example, the following metric $M_{sem}$ can be calculated to estimate the success of the semantic obfuscation:

$$M_{sem} = \frac{\text{abs}(N_{c,orig} + N_{w,orig} + N_{e,obfus} - N_{raw,obfus})}{\max(\{N_{c,orig} + N_{w,orig} + N_{e,obfus}\}, N_{raw,obfus})} \quad \text{Eq. 6}$$

where $N_{c,orig}$ is the total number of high-level RTL constructs in the original RTL;

$N_{e,obfus}$ is the number of extra state elements included in the obfuscated design;

$N_{w,orig}$ is the total number of internal wire declarations in the original RTL; and $N_{raw,obfus}$ is the number of reg, assign and wire declarations in the obfuscated RTL.

Figure 9:
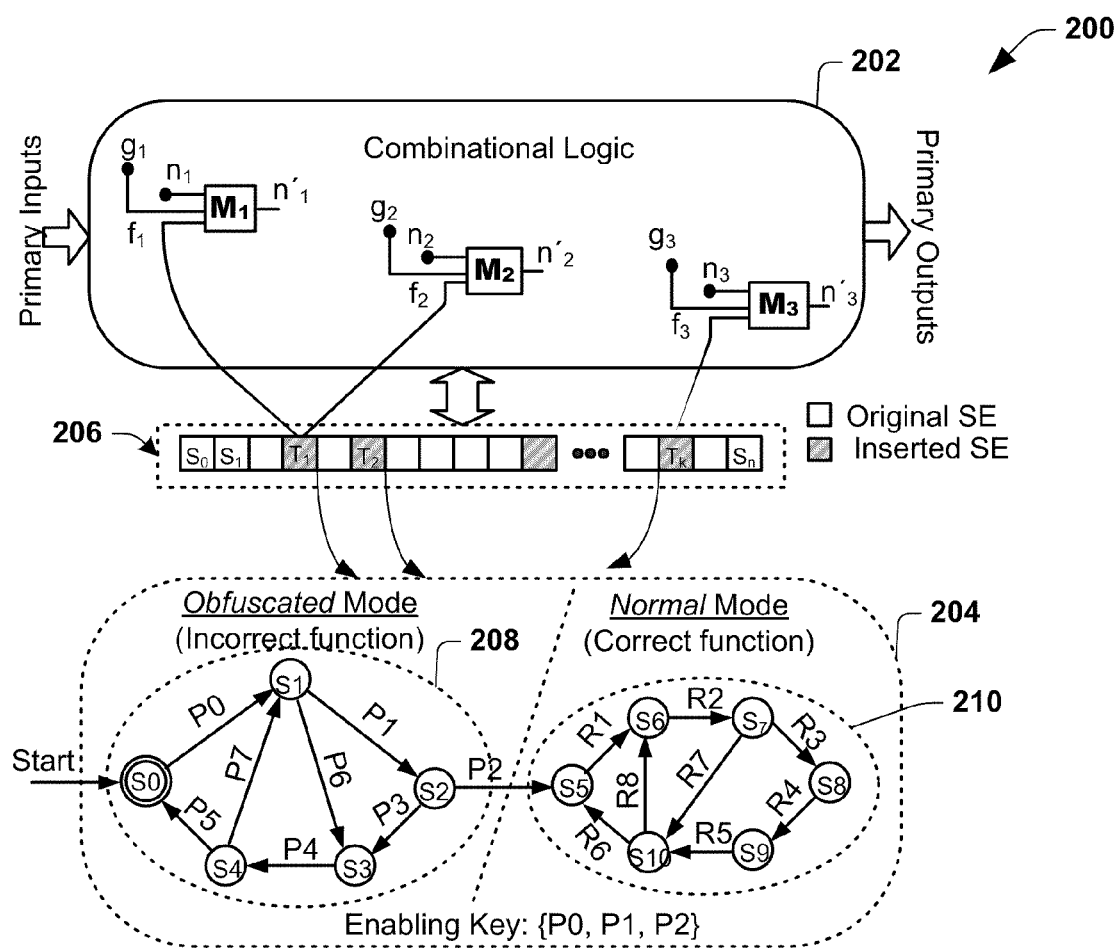
FIG. 9 depicts an example of functional obfuscation that can be implemented via gate-level modifications.

FIG. 9 depicts a scheme 200 that demonstrates changes in the internal node structure of combinational logic 202 and a corresponding state diagram 204 for a modified state transition function. In one embodiment of an obfuscated circuit design, it is only on application of a specific initialization key (e.g., an input sequence of N vectors) that it reaches a state which allows the circuit to operate in its normal mode. The initial state and the states traversed before a successful initialization constitute a "pre-initialization state space". Thus until the initialization key has been applied, the circuit operates in its obfuscated node, such that its outputs do not correspond to the circuit's desired function.

In the example of FIG. 9, the state diagram 204 has been modified, as described herein such that a subset of the state machine, indicated at 208, corresponds to the obfuscated mode that prevents normal functionality. Thus in this example of the modified state machine 204, P0→P1→P2 is demonstrated as the correct initialization sequence to transition from the obfuscated mode to the normal mode. The key or initialization sequence can be determined by the IP designer, and it can change from one instance of the IP to another.

The additional states in the pre-initialization state space can be realized by either inserting additional state elements (SEs) 210 or using unreachable states of the existing state machine. For instance, in FIG. 9, state elements $T_1$, $T_2$ and $T_k$ have been intermingled with the original state elements, such that logic sharing can be implemented between the original circuit, the modified FSM and the modification cells. This helps make the circuit modifications unidentifiable.

Besides controlling the mode of circuit operation, the modified state machine also affects selected internal nodes in the logic structure 202 based on its states. For instance, modification cells (e.g. M1 through M3, such as can be XOR gates) are inserted at the selected internal nodes. The modification cells affect the logic values on these nodes based on "enable" (en) signals derived from the current state of the state machine. This modification scheme helps ensure that when all the en signals are at logic-0, the logic values at the modified nodes are the same as the original ones—corresponding to normal operation of the circuit.

As described herein, a set of internal nodes of the combinational logic 202 can be structurally modified to implement the modified state transition function, such as corresponding to the transitions in the obfuscation mode state diagram 208. In the example of FIG. 9, the structural modification can be implemented via modification cells M1, M2 and M3, which can be designed to implement logic to perform the state transitions demonstrated in the obfuscation mode state diagram 208. Provided these nodes are selected judiciously, modifications at even a small number of nodes can greatly affect the logic structure and functional behavior of the circuit. To add to the security scheme, enable signal for different modification cells can be made to depend on arbitrary combination of inserted state elements while ensuring that it evaluates to logic-0 in normal mode.

Figure 10:
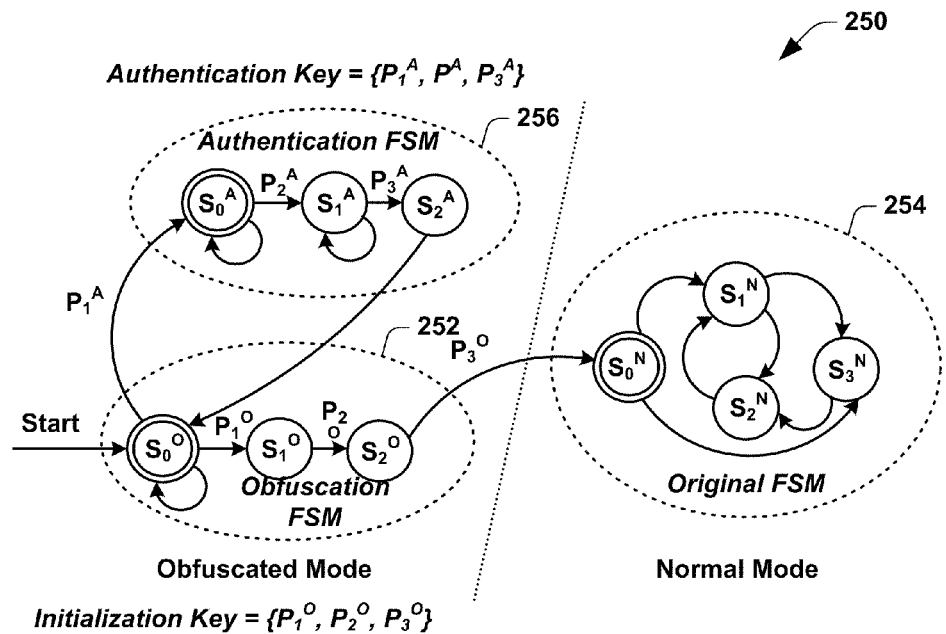
FIG. 10 depicts an example of a state diagram for an obfuscated circuit implementing authentication for digital watermarking.

As a further example, the state transition function can be modified to provide an authenticating signature. FIG. 10 demonstrates an example of a state diagram 250 that includes an obfuscation FSM 252, an original FSM 254 and an authentication FSM 256. The obfuscation and authentication FSMs 252 and 256 can be implemented by modifying the state transition function of the original circuit, such as shown and described herein. While in the example of FIG. 10 the obfuscation and authentication are demonstrated as separate FSMs that provide for distinct state transitions, it will be appreciated that the obfuscation technique itself can be implemented to afford authentication. For instance, the obfuscation FSM 252 can embed hard-to-remove authentication signature within the design, thus providing simultaneous obfuscation and authentication at a low design overhead.

In the example of FIG. 10, the obfuscation FSM 252 is designed to prevent operation of the circuit in the normal mode until an initialization key is applied at the primary inputs. For instance, the initialization key for transitioning through the states of the obfuscation FSM is demonstrated as $P_1^O$, $P_2^O$ and $P_3^O$. Thus, in response to applying the initialization key to the inputs, the circuit changes from the obfuscation mode to the normal mode, similar to the example of FIG. 9.

The authentication FSM 256 provides a mechanism to authenticate the origin of a given design even in circumstances where an unauthorized user has been able to bypass the obfuscation FSM 252, such as by illegally procuring the initialization key. The authentication FSM 256 is designed to provide a predetermined output sequence in response to applying an authentication key at the primary inputs of the circuit. For instance, the authentication key for transitioning through the states of the authentication FSM 256 is demonstrated as $P_1^A$, $P_2^A$ and $P_3^A$. From the final state of the authentication FSM $S_2^A$ the circuit can transition back to the initial state of the obfuscation FSM. In this way, the authentication FSM can provide a digital watermark. Since the authentication FSM 256, as well as the obfuscation FSM can form an integral and indistinguishable part of the modified design, as described herein, much greater resistance to reverse-engineering can be afforded than other authentication mechanisms.

FIG. 9 depicts an example of a design flow 600 for use in protecting an evaluation version of an IP. The method 600 includes three main portions: Trojan Design 602; Trojan Insertion 606 and Trojan Obfuscation 616. The Trojan design portion can be utilized to design and generate a pool of Trojans 604, which can be stored in memory (e.g., as a Trojan library) for insertion into different IP instances. By way of example, the Trojans in the pool 604 can have the following characteristics: (a) the Trojan is a finite state machine (FSM) that activates and disrupts the original circuit functionality only on the occurrence of a pre-defined rare sequence of inputs, referred as the Trojan activation condition; (b) the inputs of the Trojan are derived from internal nodes of the original design with low signal probability (to realize rare transition condition); (c) the Trojan FSM causes some dummy state transitions (e.g., transitions which do not lead it to activation) which mitigates Trojan isolation and detection by an adversary through structural analysis, and (d) an inserted Trojan can be disabled by the application of a fixed sequence of input vectors (e.g., a disabling key) at the primary inputs. An example state diagram for such a Trojan is shown in FIG. 12.

Characteristic (a) ensures that the Trojan does not disrupt normal functionality until it has been activated, while (b) ensures that the IP remains enabled for sufficient time to perform a comprehensive evaluation. The characteristic (c) ensures that the inserted Trojan state elements behave like other state elements in the design performing state transitions and are thus not easily distinguishable through structural analysis.

Figure 11:
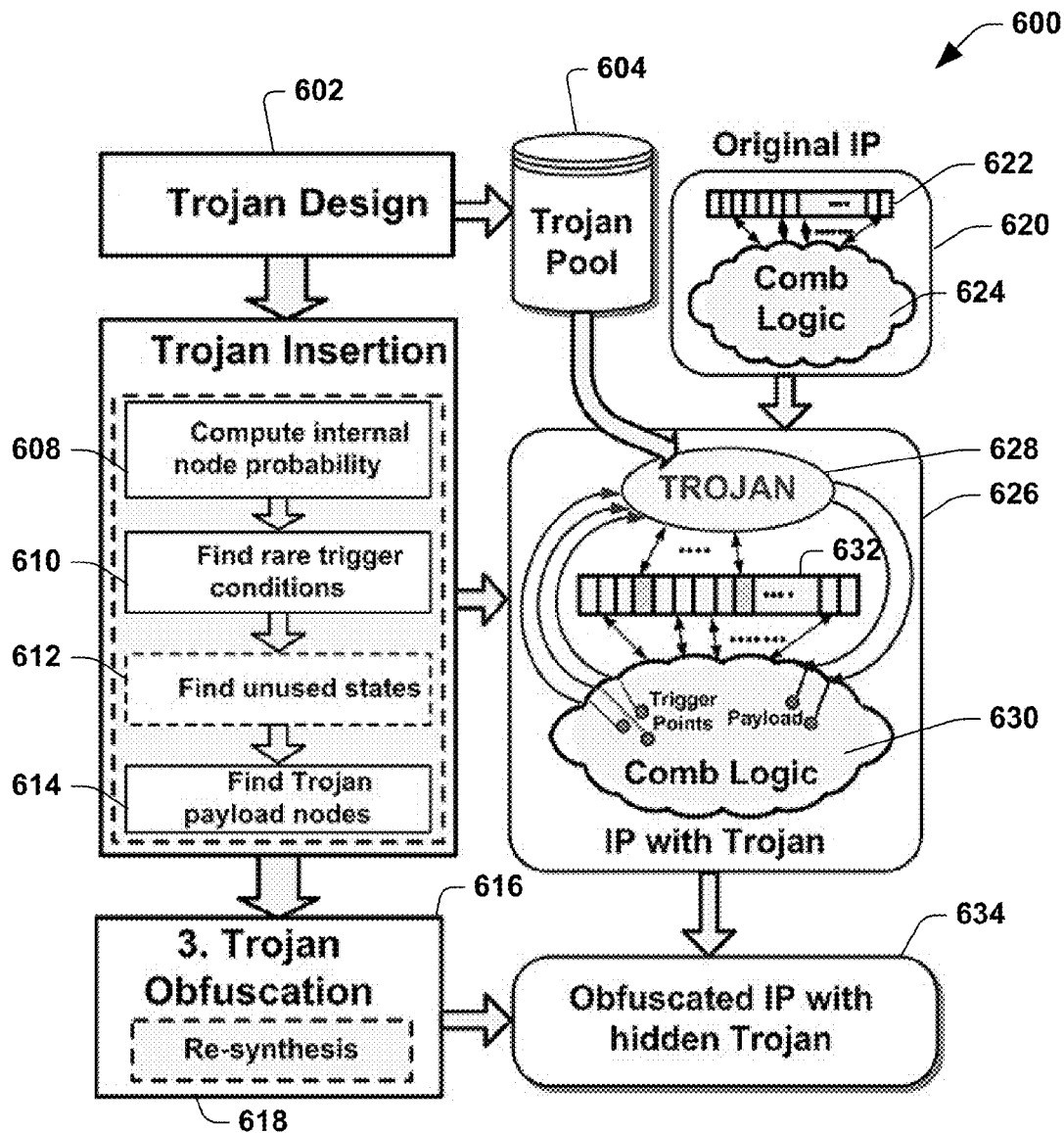
FIG. 11 depicts an example design flow for obfuscating an IP core by insertion of a Trojan.

It will be appreciated that the Trojan insertion 606 and obfuscation 616 can be implemented via similar techniques to the insertion of the obfuscation sequential structure, shown and described herein. In the example of FIG. 11, the Trojan insertion includes computing signal probability of internal nodes, indicated at 608, for the original IP 620. The original IP 620 can include state elements 622 that perform state transitions based on inputs provided to combinational logic 624. Rare trigger conditions are also determined at 610 for the Trojan based on the computed internal node probability. The inputs of the Trojan can thus be derived from several internal nodes chosen, at random, from circuit description, such as the gate-level netlist. Existing or yet-to-be-determined algorithms for computing signal probability at internal nodes of a design can be used to identify nodes for use in building the state transition condition in the Trojan.

As mentioned above, the time taken by the inserted Trojan to activate is not deterministic—instead, it is a pseudo-random value, which can be probabilistically determined. The activation time depends on the actual Boolean logic utilized for the Trojan state transition function, which gets satisfied based on the actual sequence of input vectors applied to the circuit. By way of further example, the expected time of Trojan activation ($T_{mean}$) is the mean number of consecutive clock cycles after which an embedded Trojan gets activated, during simulation of the IP at design phase or during post-fabrication deployment. For instance, when an IP vendor provides an IP to a designer for a minimum evaluation period of $T_{eval}$, it should be ensured that the probability of the Trojan getting activated before $T_{eval}$ is negligibly small, assuming continuous operation. In this example, let the time of activation of the Trojan ($t_{active}$) be a random variable following a probability distribution $p(t_{active})$ with expectation $T_{mean}$. Then, $p(t_{active})$ can be represented by a "bell-shaped" curve with maxima at $\mu$. Here, $\mu$ may or may not be equal to $T_{mean}$. The value of $T_{eval}$ should satisfy the condition:

$$P_1 = P(t_{active} \leq T_{eval}) = \int_0^{T_{eval}} p(t_{active}) dt_{active} < \epsilon_1 \qquad \text{Eq. 7}$$

where $\epsilon_1$ is a parameter that determines the probability of the Trojan becoming activated before $T_{eval}$.

As an example, a goal of an IP vendor would be to design a Trojan such that $\epsilon_1$ is minimized for a given $T_{eval}$. This can be ensured by a proper choice of triggering nodes with small enough triggering probability. However, some IP vendors may want to impose an additional constraint of an upper limit on $t_{active}$, such as a term $T_{max}$. The upper limit $T_{max}$ can be utilized within to ensure that the Trojan actually becomes active within a reasonable number of clock cycles of operation after $T_{eval}$. When such a constraint is used, the additional constraint that must be satisfied is:

$$P_2 = P(t_{active} \leq T_{max}) = \int_0^{T_{max}} p(t_{active}) dt_{active} > 1 - \epsilon_2 \qquad \text{Eq. 8}$$

where $\epsilon_2$ is another parameter, which should also be minimized for a given $T_{max}$.

Thus the relationships of Eqs. 7 and 8 can be utilized as part of the design process to define the activation time to a probabilistic value that can be set by the IP vendor.

It can be noted that since the state transitions depend on internal node conditions, Trojan activation time will depend on input behavior and thus becomes non-deterministic. It is however possible to ensure that the Trojan triggering probability can be sufficiently low to prevent activation during an evaluation period, which can be set by the designer. For instance, the number of activation cycles for the Trojan can be increased by choosing a rarer trigger condition or selecting a Trojan with larger number of states.

As a further example, FIG. 12 demonstrates a process 640 that can be utilized to find Trojan trigger nodes and payload nodes of the Trojan being inserted. For example, the input to the algorithm can include the gate-level netlist of the IP, a number of modifications to be made in the netlist, the RTL "template" of the Trojan to be inserted. The inputs can also include the number of trigger nodes of the Trojan to be inserted, the number of input conditions that would cause state transitions to the Trojan state machine, and a trigger threshold value to determine the internal nodes which can act as trigger nodes for the inserted Trojan.

For example, to determine the Trojan trigger nodes, a set of random vectors can be generated. The circuit is simulated using this set of randomly generated vectors. The signal probability of the internal nodes can be estimated from the simulations. The nodes with signal probability below the given trigger threshold value, which can be set by a user via a user interface, can be defined as rare nodes. From this set of rare nodes, the desired number of trigger nodes for the Trojan are selected. Additionally, from the logic values at these nodes obtained from simulations, the required number of rarest logic value combinations can also be chosen as the Trojan state transition conditions.

The Trojan RTL template is then "filled-up" to complete the behavioral description of the Trojan. Next, the fan-out and fan-in cones of each internal node are enumerated and a weighted normalized metric based on the sizes of these is estimated, such as shown in FIG. 12. For instance, any modification made at a node with a higher value of this metric ensures that the effect of the modification would be propagated to large parts of the IP. The nodes in the circuit are then ranked based on this metric. The required number of nodes to be modified by the Trojan can then be chosen from among the top ranked nodes N. As a precaution, no Trojan trigger node should reside in the fan-out cone of the modified nodes, which eliminates any erroneous combinational loop in the modified circuit.

The selected trigger nodes are "stitched" to the Trojan netlist, and corresponding logic (e.g., extra gates) can be inserted as required depending on the selected value and the Trojan trigger logic values. Each Trojan payload node can be modified by XOR-ing it with one of the Trojan outputs which evaluate to logic-1 in the activated state, in effect inverting the expected node value. Instead of using an XOR gate, the IP designer can potentially use other Boolean functions to modify the value at a node, because using the same gate (e.g., XOR) at all payloads can help an adversary to identify the Trojan through structural analysis. The IP designer only needs to ensure that prior to Trojan activation the logic values at the modified nodes are not altered. It is worth noting that information about the functionality of a logic block can be used for payload selection to ensure that Trojan activation affects the output significantly. For example, if a Trojan modifies the least significant output bit of multiply-and-accumulate block in a Discrete Cosine Transform (DCT) hardware, the resultant impact on the output image quality can be negligible. Similarly, if a particular output bit is truncated/masked before it drives the next stage, it should not be selected as payload. Those skilled in the art may understand and appreciate other constraints that can be utilized to determine an appropriate set of trigger nodes and payload nodes for a given Trojan.

Returning to FIG. 11, Trojan insertion 606 can employ unused states of the original circuit design, and thus may employ methods to identify a selected set of unused states, as indicated at 612. The unused states located in the original IP 620 can be used as part of the state transitions that form the Trojan (or other obfuscation structure) being inserted. In addition or as an alternative, state elements can be inserted into the original circuit description to provide the states for use in the Trojan FSM. That is, the state transitions that define the Trojan can be implemented entirely by expanding a register or other structure in the original IP 620 to include more state elements for the Trojan, by using unused states in the original IP or as a combination of unused states and new state elements.

At 614, Trojan payload nodes are determined in the combinational logic 630 to implement a Trojan 628 selected from the pool 604 in the modified circuit description 626. The payload nodes can be determined as a subset of nodes having desired values that can be selected to correspond to the states of the Trojan state machine. Once the payload nodes have been determined at 614, the Trojan insertion 606 can be implemented by modifying the circuit description, such as modifying an original netlist. The original IP can be transformed into a modified IP with the Trojan 626, which can include state elements 632 that perform state transitions based on inputs provided to combinational logic 630. For instance, the combination logic 630 is modified to implement the state transition conditions defined by the Trojan according to the determined trigger points and payload nodes.

The Trojan outputs can be XOR-ed with high fan-out internal nodes in the circuit which ensures that the effect of the Trojan is propagated to large parts of the circuitry. Additionally, to reduce the hardware overhead caused by the Trojan insertion, the invalid states of the original circuit can be re-used to implement the Trojan to further help obfuscate the Trojan.

The Trojan obfuscation 616 involves the re-synthesis, demonstrated at 618, of the modified gate-level design 626. The re-synthesis causes the Trojan state-machine 628 to share logic with the original circuit, and thus helps to make the Trojan less detectable by structural analysis. To avoid detection by functional analysis, the Trojan activation should be delayed by a sufficiently long (e.g., probabilistically determined) time, so that it takes many cycles of operation to cause the circuit to malfunction. Thus it needs to be ensured with high confidence that the Trojan will not activate under functional testing during the evaluation period.

Figure 13:
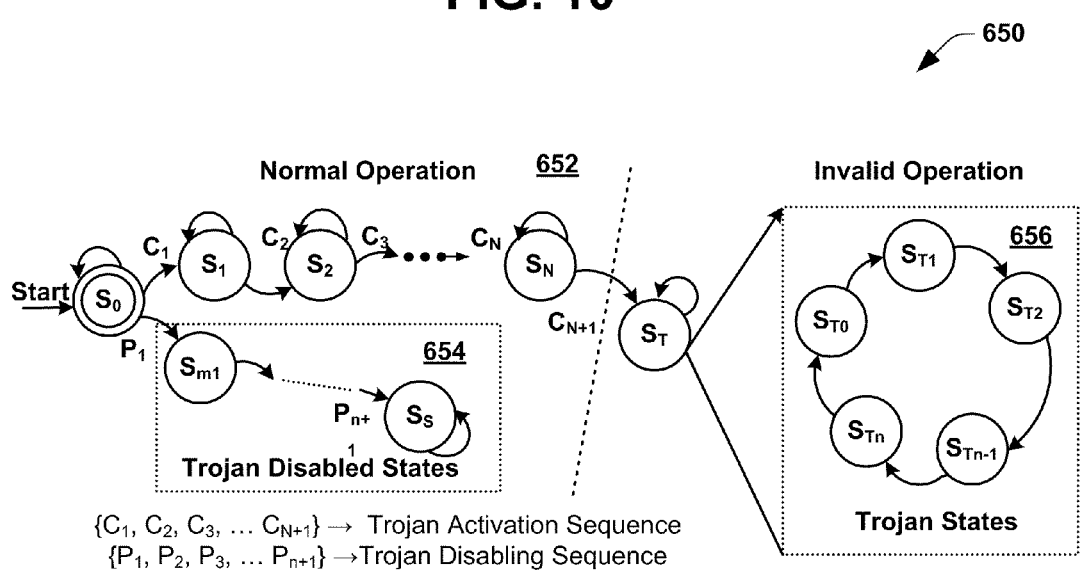
FIG. 13 depicts an example of a state diagram demonstrating functional obfuscation via a Trojan that may be selectively activated or disabled.

FIG. 13 depicts a state diagram 650 for a circuit design in which a Trojan has been inserted, such as according to the scheme 600 of FIG. 11. The state diagram 650 demonstrates states $S_0, S_1, S_2 \ldots S_N$ corresponding to normal operation of the circuit, such can be implemented as part of an evaluation mode. That is normal operation can continue until the probabilistically determined sequence of state transitions occurs to trigger activation of the Trojan states. Thus from state $S_N$, after a preceding sequence of predetermined states, corresponding to conditions (e.g., values) of internal nodes, if condition $C_{N+1}$ occurs, the circuit changes from its normal operating mode to an invalid operating modes corresponding to Trojan states. When this occurs, the normal expected functionality of the circuit is disabled.

This invalid operation mode caused by the Trojan state conditions 656 can be disabled by the application of a key (e.g., or a Trojan disabling sequence) at primary inputs of the circuit. That is, in contrast to the conditions at a selected set of internal nodes during normal operation, which can result in activating the Trojan state machine, the disabling key is provided at primary inputs to disable the Trojan. By allowing the inserted Trojan to be disabled, the IP vendor has the option of licensing the same IP to a customer along with the disabling input sequence (the disabling key). Further, the sequence of inputs that takes the Trojan to the active state can operate as a digital watermark for the IP, and can help to authenticate the design, without incurring any additional design overhead.

It will thus be appreciated that this design technique affords the IC designer (or other user) the freedom to evaluate a fully functional evaluation version of the IP core, using a preferred set of design automation tools, while protecting the rights of the IP vendor. This design technique can be integrated with the hardware obfuscation technique to complement each other in the complete design flow.

It is intuitive that the size of the obfuscation state space will be larger compared to the size of the normal state space. For instance, it can be shown that the size of the obfuscation state space has an exponential dependence of the number of extra state elements added. Additionally, in a circuit where the size of the used state space is small compared to the size of the unused state space, higher levels of obfuscation can be achieved at lower hardware overhead by utilizing the unused state space.

Figure 14:
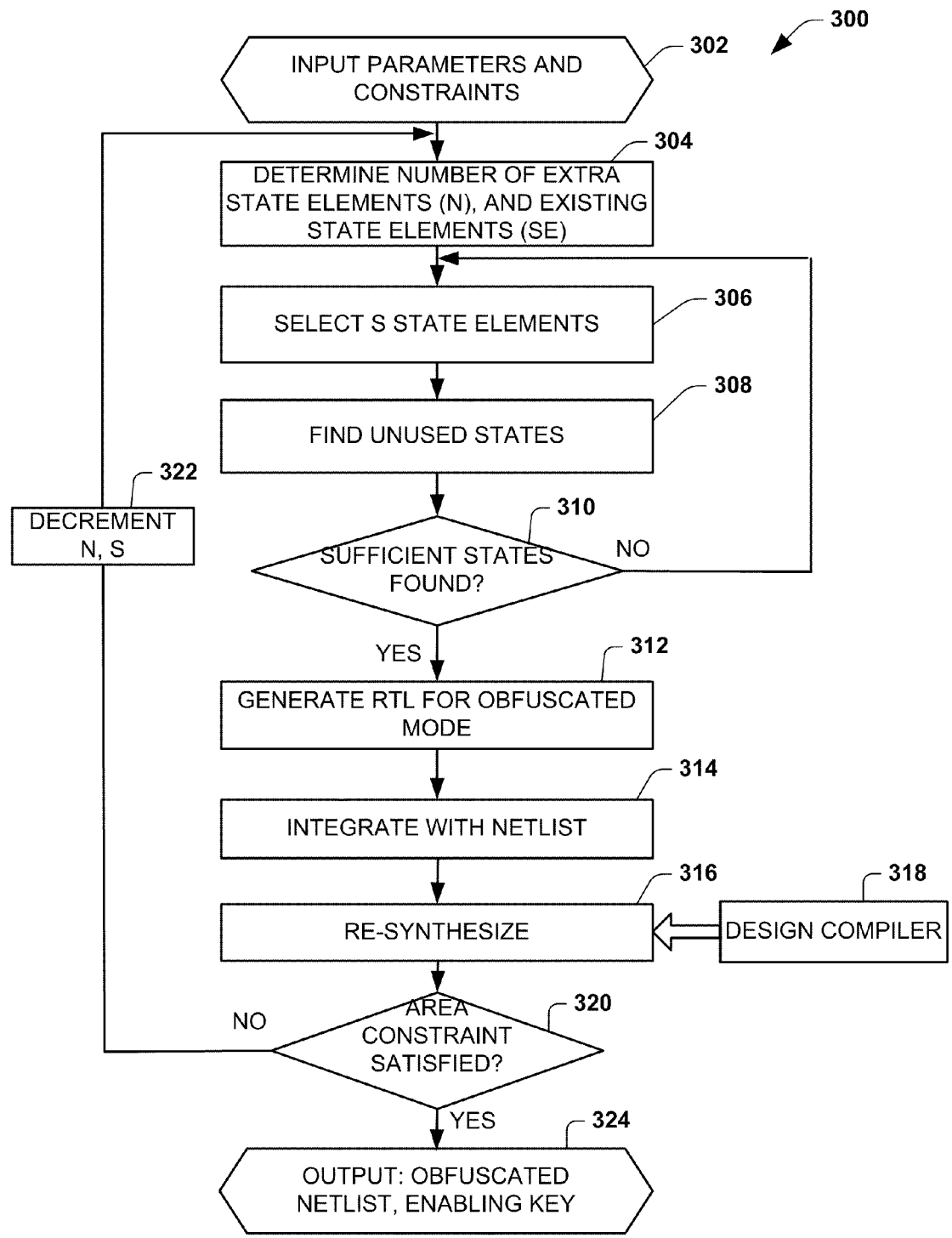
FIG. 14 is a flow diagram for a general obfuscation method in which obfuscation can be performed on an RTL.

FIG. 14 depicts an example method 300 that can be employed to protect a circuit design, which can utilize unused state space from an original design. This approach can be used to increase the level of security while also reducing overhead to implement the obfuscation. The approach demonstrated in FIG. 14 is equally applicable to constructing an obfuscation state space for Trojan insertion as well as other forms of obfuscation shown and described herein.

The method 300 begins at 302, in which input parameters and constraints are provided. The input parameters and constraints further can include, for example, an RTL description for the circuit for which the obfuscation is being performed as well as an area constraint for the modified circuit design. At 304, a number of extra state elements (N) and a number of existing state elements (SE) are determined for the method. The existing state elements can be ascertained from the RTL description and the number of extra state elements can be determined according to the obfuscation sequential structure (e.g., an FSM) that is to be inserted into the circuit description. For instance, an obfuscation FSM can be constructed by a user or be selected from a library of FSMs, which can be selected by a designer.

At 306, the existing state elements are selected for analysis to ascertain, at 308 a number of unused states. The number of unused states can be determined from simulation for the existing state elements. As mentioned above, unused states can be utilized for one or more states in obfuscation state machine to increase the level of protection as well as reduce the overhead for implementing the obfuscation.

At 310, a determination is made as to whether sufficient states have been found for accommodating the obfuscation state transitions. If an insufficient number of states are found, the method returns to 306 for further evaluation of the state elements and determining unused states. Once a sufficient number of states are found, the method can proceed from 310 to 312.

At 312, an RTL description can be generated for a state machine designed to operate in the obfuscated mode. The RTL description being generated can employ extra state elements that have been inserted for implementing obfuscation (e.g., the extra state elements determined at 304), unused states located at 308 can be used, or a combination of inserted state elements and unused states can be used to provide the obfuscation state transitions. In order to implement the desired state transitions for the obfuscated mode, additional logic can be generated, such as by modifying logic and/or inserting modification cells into combinational logic of the original circuit description (e.g., the original RTL).

At 314, the RTL that has been generated at 312 for implementing the obfuscation state machine can be integrated with the netlist corresponding to the original RTL description. At 316, an integrated RTL can be re-synthesized, such as described herein, which may involve a design compiler, demonstrated at 318. Examples of commercially available compilers and other design tools are commercially available from Synopsis, Inc. of Mountain View, Calif.

At 320 a determination is made as to whether an area constraint has been satisfied. If the area constraint has not been satisfied the method proceeds to 322 in which one or both of the extra state elements or a number of existing state elements is decremented. With the decrease in number of such state elements, the method returns to 304 to repeat 304 through 320. It will be appreciated that the number of extra state elements can be decremented while the number of existing state elements for use in generating the obfuscated RTL description that satisfies the size constraints that were input at 302. Once the area constraint has been satisfied for a synthesized RTL design, the method can proceed to 324 in which the obfuscated netlist and associated enabling key can be output (e.g., stored in memory).

Figure 15:
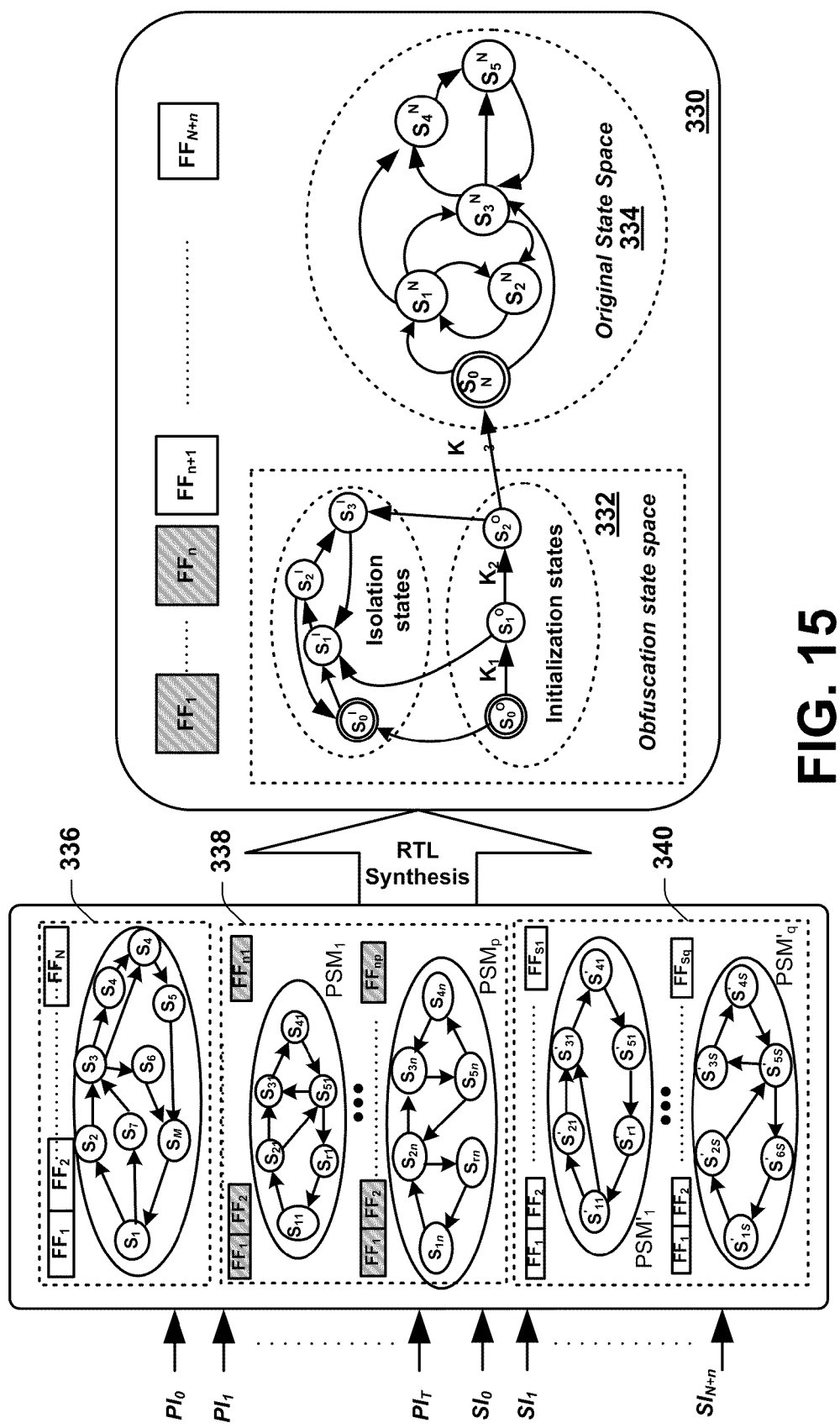
FIG. 15 depicts an example obfuscation method applied to groups of state diagrams and state elements to produce an obfuscated design.

FIG. 15 depicts an example of an approach that can be utilized in conjunction with the method 300 of FIG. 14 for use in constructing an obfuscated design 330 that includes both an obfuscated state space 332 and an original state space 334. As part of the obfuscation method, the state transition function can be separated into groups such as can include an original state machine corresponding to the original RTL code, as well as groups of parallel state machines 338 and 340. The state machines 338 correspond to the extra states due to the inserted state elements. The state machines 340 represent the unused or unsearchable states of the original state machine. Thus, in the example of FIG. 15, the N extra state elements are grouped into the parallel finite state machines represented at $PSM_1$ through $PSM_P$. Similarly, the unused states can be grouped also into parallel finite state machines represented at $PSM'_1$ through $PSM'_Q$. RTL code can be generated separately for each of the finite state machines PSM1 through PSM as well as $PSM'_1$ through $PSM'_Q$. Thus the scheme of having multiple parallel finite state machines to design the obfuscation state space 332 of the obfuscated design allows similar design obfuscation effects to be achieved without incurring high computational complexity and design overhead associated with other approaches.

Figure 16:
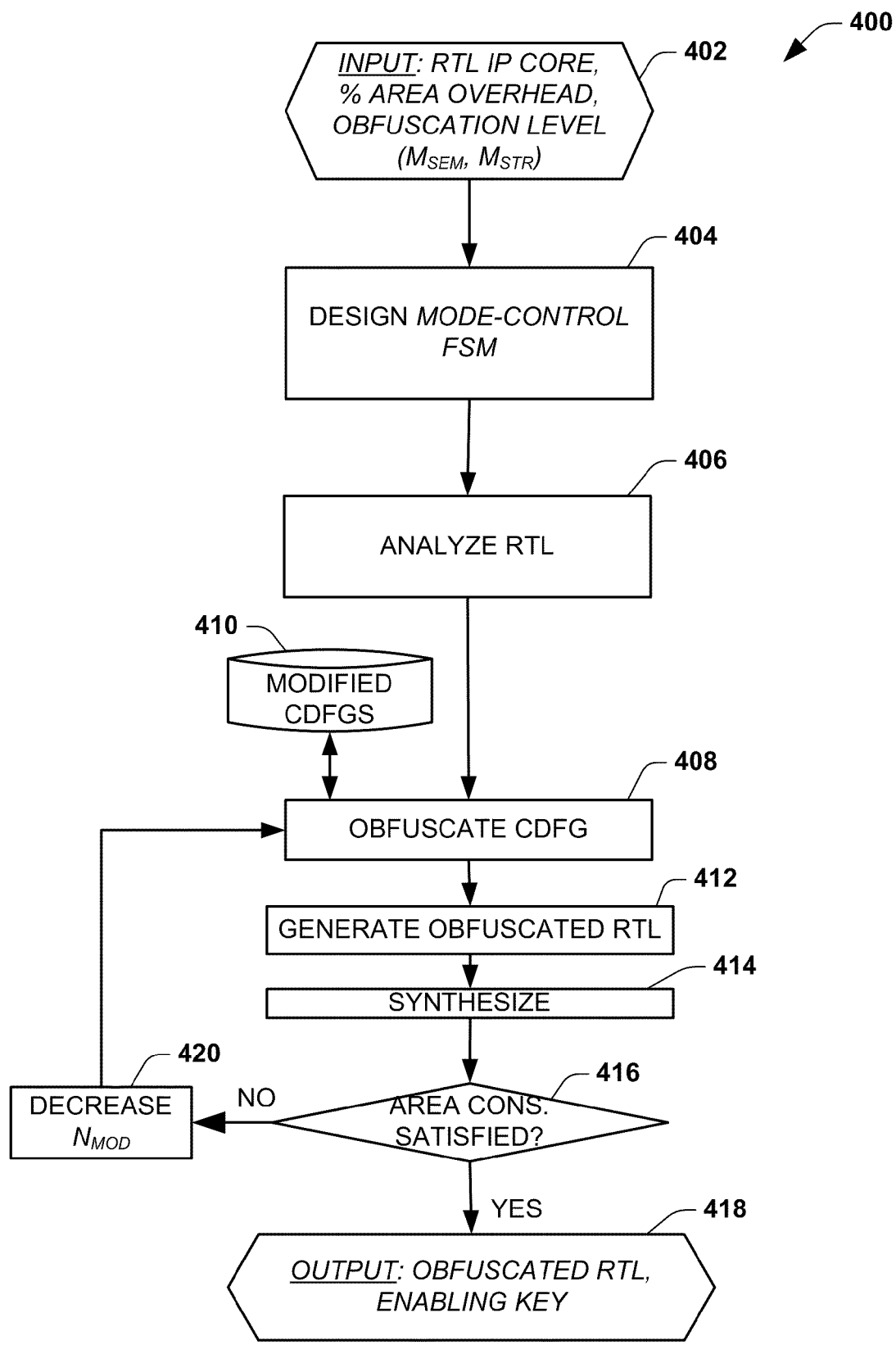
FIG. 16 is a flow diagram depicting an example RTL obfuscation method.

FIG. 16 depicts an example method 400 that can be used to protect a circuit design. In the example of FIG. 16, the design obfuscation is performed on a CDFG data structure representation of a given circuit design. The method 400 begins at 402 by providing the input circuit description (e.g., the original RTL IP core) and related parameters. For instance, the input parameters can include the desired obfuscation level represented by an obfuscation metric ($M_{obf}$), and the maximum allowable area overhead.

By way of example, consider a case where n mode-control FSM state-transition statements have been hosted in an RTL description with N blocking/non-blocking assignment statements. However, since an adversary (e.g., hacker) does not know a-priori how many registers host the mode-control FSM, such adversary must correctly figure out the hosted FSM state transition statements from one out of $$\sum_{k=1}^{n} \binom{N}{k}$$

possibilities. Again, each of these choices for a given k has k! associated ways to arrange the state transitions (e.g., so that the initialization key sequence is applied in the correct order). Hence, the adversary must correctly identify one out of $$\sum_{k=1}^{n} \left( \binom{N}{k} \cdot k! \right)$$

possibilities.

Another feature that needs to be deciphered by the adversary for detecting the obfuscated structure(s) are the mode control signals. As an example, let M be the total number of blocking, non-blocking and dataflow assignments in the RTL, and let m be the size of the modification signal pool. Then, the adversary must choose m signals correctly out of M signals, which is one out of $$\binom{M}{m}$$

choices. Combining these two security features, the $M_{obf}$ metric can be determined to estimate the resilience and stealth of the obfuscated design, such as follows:

$$M_{obf} = \frac{1}{\sum_{k=1}^{n} \left( \binom{N}{k} \cdot k! \right) \cdot \binom{M}{m}} \qquad \text{Eq. 9}$$

A lower value of $M_{obf}$ indicates a greater obfuscation efficiency.

At 404, the mode-control FSM is designed. An example process for designing a mode-control FSM is demonstrated in FIG. 16. The design at 404 can be performed according to a target obfuscation efficiency, such as the target $M_{obf}$. The design provided at 404 can provide a specification for the mode-control FSM, which can include its state transition graph, the length of the initialization key sequence, the state encoding, the pool of modification signals and the initialization key sequence. Random state encoding and a random initialization key sequence can be generated to increase the security.

Figure 20:
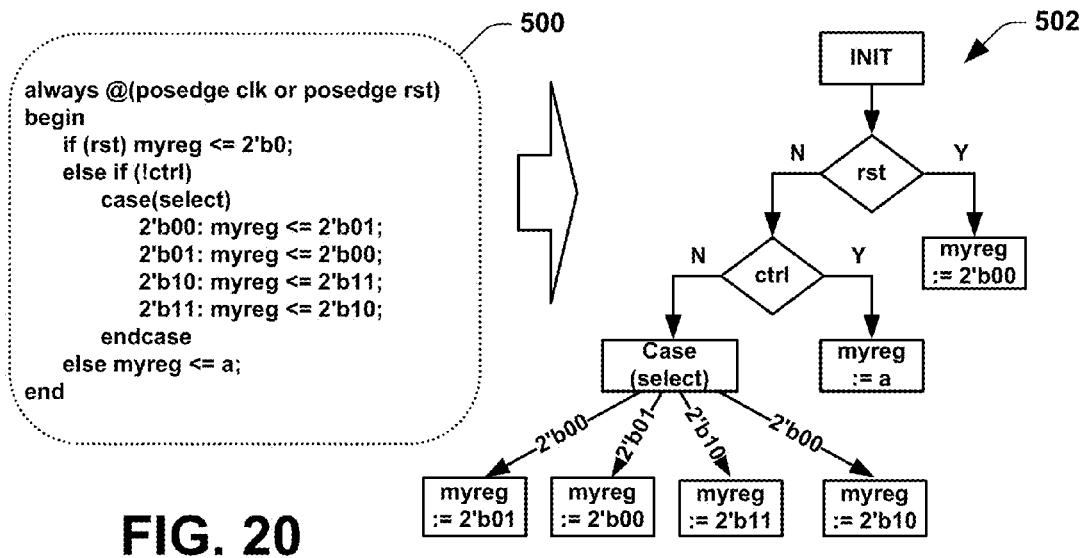
FIG. 20 is an example of RTL being transformed into a control data flow graph (CDFG) data structure.

At 406, the RTL is analyzed. An example method for analyzing RTL is demonstrated in FIG. 18. For instance, the given RTL is parsed and concurrent blocks of RTL code are transformed to corresponding CDFG data structures, which are referred to as the original CDFGs. By way of example, FIG. 20 demonstrates the transformation of an "always @( .. . )" block of RTL code 500 to its corresponding CDFG data structure representation, indicated at 502.

At 408, the CDFG is obfuscated. The CDFGs are obfuscated by modifying the control flow of the circuit design, such as based on the control signal generated from the FSM (at 404). A set of modified CDFGs can be stored in memory and utilized during the obfuscation at 408. For instance, the CDFGs, including the modified CDFGs, can also be modified by introducing or modifying data flow components. An example method for obfuscating the CDFG is demonstrated in FIG. 19.

At 412, an obfuscated RTL is generated from the output of the CDFG obfuscation at 408. For instance, the RTL can be generated by traversing each of them in a depth-first manner. At 414, the obfuscated RTL can be synthesized and flattening can be performed to provide further semantic obfuscation, such as described herein.

At 416, a determination is made as to whether the area of the synthesized circuit satisfies an area constraint. If the area constraint is not satisfied, such as in response to determining that the calculated area overhead exceeds the overhead constraint, the method proceeds to 420, and the number of modifications ($N_{mod}$) is changed. For instance the number of modifications ($N_{mod}$) can be decreased by a pre-defined step-size and the method can return to 408 for repeating 408 to 416. Alternatively or additionally, a balancing between control flow modifications can be performed to maximize the obfuscation effect for a minimum overhead. If it is determined at 416 that target area overhead is satisfied, the method proceeds to 418 and the output of the obfuscated RTL and one or more keys can be provided (e.g., and stored in memory).

Figure 17:
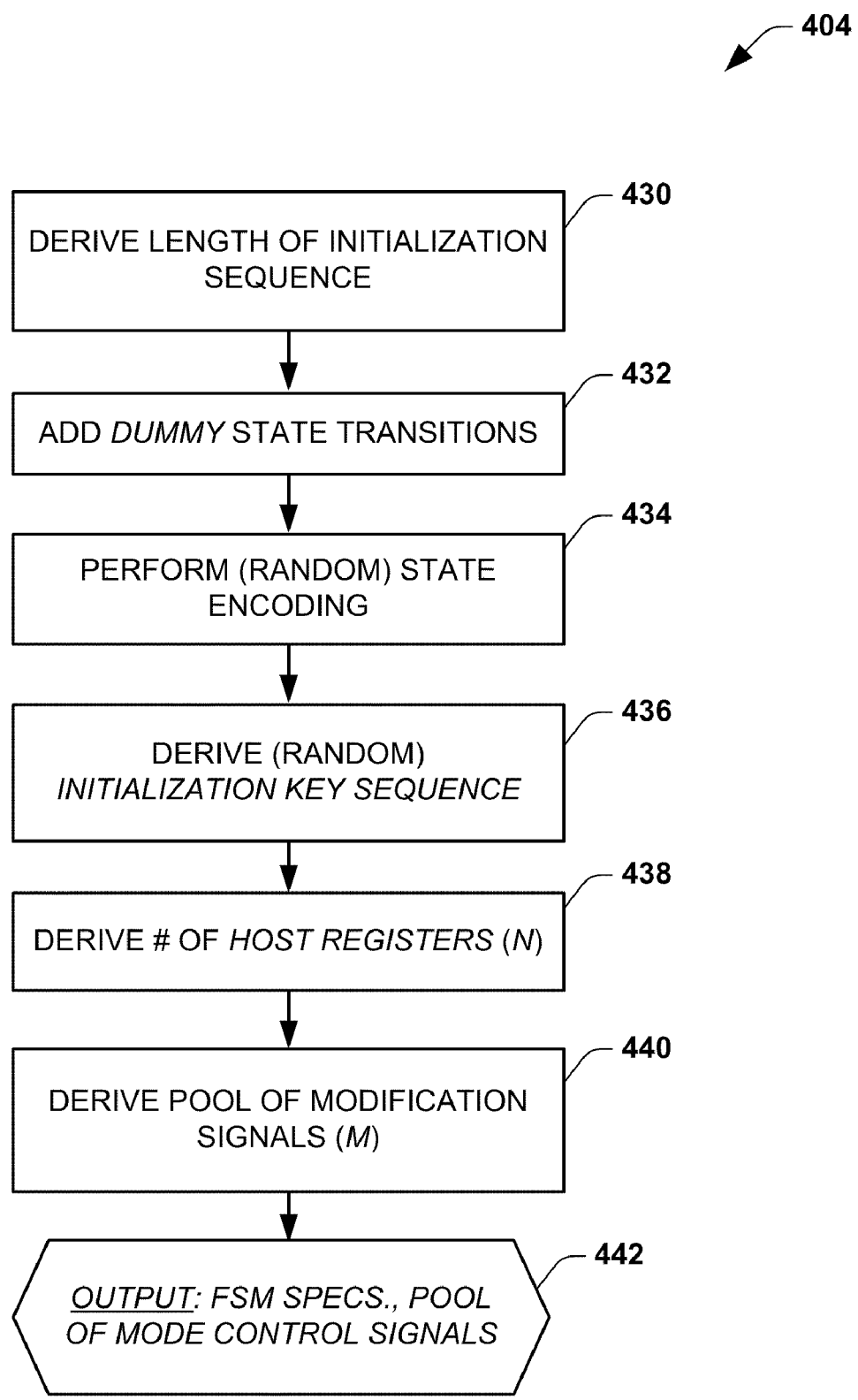
FIG. 17 is a flow diagram depicting an example method for designing a mode-control finite state machine.

FIG. 17 depicts an example of a method 404 for generating a mode-control FSM, such as corresponding to 404 of FIG. 15. The mode-control FSM design process 404 begins at 430, in which a length of an initialization sequence is derived. The length of the initialization sequence can be user-defined according to protection requirements or it can be set to a predetermined default length.

At 430, dummy state transitions are added to the obfuscation state machine. Such dummy state transitions can operate in both the obfuscated mode and in the normal mode. Such transitions can be inserted so that the mode-control FSM does not converge or get stuck at a particular state in either mode. This helps to increase the level of protection by making it difficult for an adversary to identify the state elements implementing the FSM through structural analysis. At 434, state encoding is performed. The state encoding can be implemented to perform encoding on the respective state transitions, including the dummy transitions at 432. The state encoding can be performed randomly to increase the security associated with the obfuscation method.

At 436 an initialization key sequence can be derived. An initialization key sequence can be randomly determined to increase security. As described herein, the initialization key sequence corresponds to a particular sequence that is applied as the primary inputs, such as to change circuit operation from the obfuscated mode to the normal operating mode.

At 438, a corresponding number of host registers (N) are determined. As described herein, the mode-control FSM can be implemented from newly inserted state elements. Such inserted state elements further may be hosted within existing registers in the design, such as by expanding the size of such registers and intermingling the state elements for the obfuscation state machine therein. The number of host registers can vary depending upon the size of the initialization sequence and whether unused states of the original state space can be utilized in construction the obfuscation state space.

At 440, a pool of modification signals is derived. The modification signal pool can be formed from Boolean functions derived from the mode-control FSM states. The modification signals affect the logic values at select nodes when the circuit is operating in the obfuscated mode, which prevents the circuit from performing its normal functionality. Once the pool of modification signals has been derived from the obfuscation FSM, the method can output the specification for the FSM as well as provide the pool of mode-control signals, representing the Boolean functions for implementing such state transitions.

Figure 18:
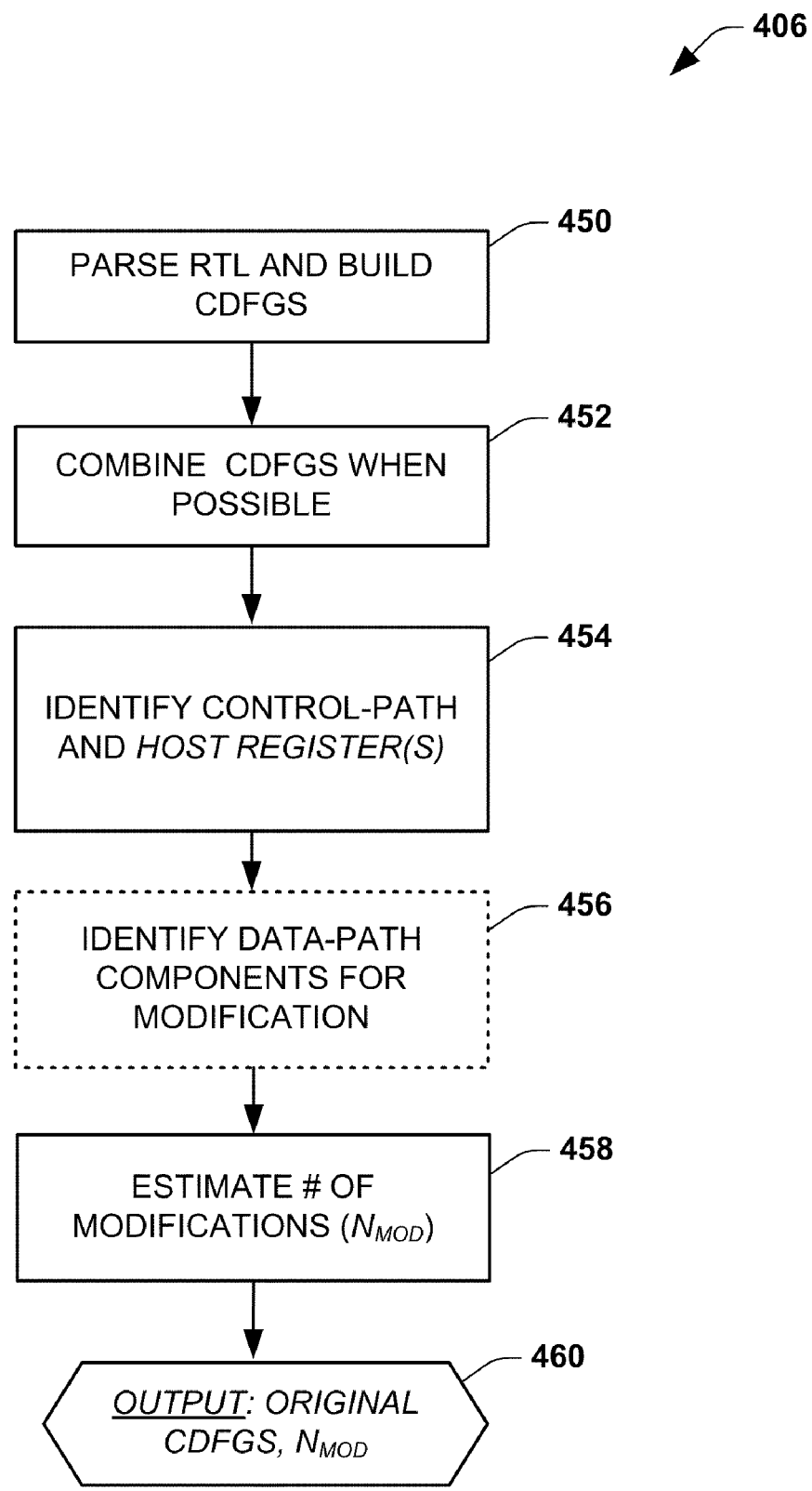
FIG. 18 is a flow diagram depicting an example method for use in analyzing RTL as part of an RTL obfuscation method.

FIG. 18 depicts an example of a process 406 for analyzing the RTL code and transforming it to a corresponding CFG data structure. At 450, the RTL is parsed and corresponding CDFGs are built (e.g., see FIG. 20). For instance, each block of RTL can result in a corresponding CDFG being constructed. At 452, resulting CDFGs can be combined. For instance, various CDFGs can be merged to build a larger combined CDFG. As one example, all CDFGs corresponding to a non-blocking assignment to clock registers can be combined together without any change of the overall functionality. Such procedures create larger CDFGs with substantially larger number of nodes than in the constituent CDFGs. Consequently, obfuscation is facilitated.

At 454, control-path and host registers are identified. For instance, instead of providing a stand-alone mode-control FSM, state elements of the mode-control FSM can be hosted in one or more existing registers in the design, such as disclosed herein. As a result, the mode-control FSM becomes an integral part of the design in contrast to a structurally isolated element.

Figure 21:
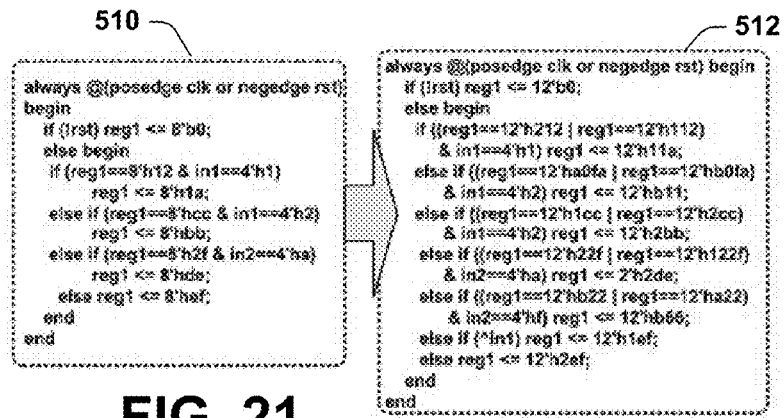
FIG. 21 depicts an example of RTL circuit representation being transformed from an original description to an obfuscated version thereof in which a register of the original design hosts an inserted sequential structure.

An example of a hosted element is depicted in the example of FIG. 21 in which an eight bit register REG1 has been expanded to twelve bits to host the mode-control FSM. When these 4-bits are set at values 4'h1 or 4'h2, the circuit operates in its normal mode, whereas the circuit operates in its obfuscated mode when such bits are at 4'ha or 4'hb. In this example, extra RTL statements have been added to make the circuit functionally equivalent in the normal mode. As disclosed herein, the obfuscation can be improved by distributing the mode-control FSM state elements in a non-contiguous manner inside the register (e.g., see FIG. 9). While the example of FIG. 21 demonstrates the additional bits of the register being continuous bits the obfuscation can be improved by distributing the state elements in a non-continuous manner within the register.

Figure 19:
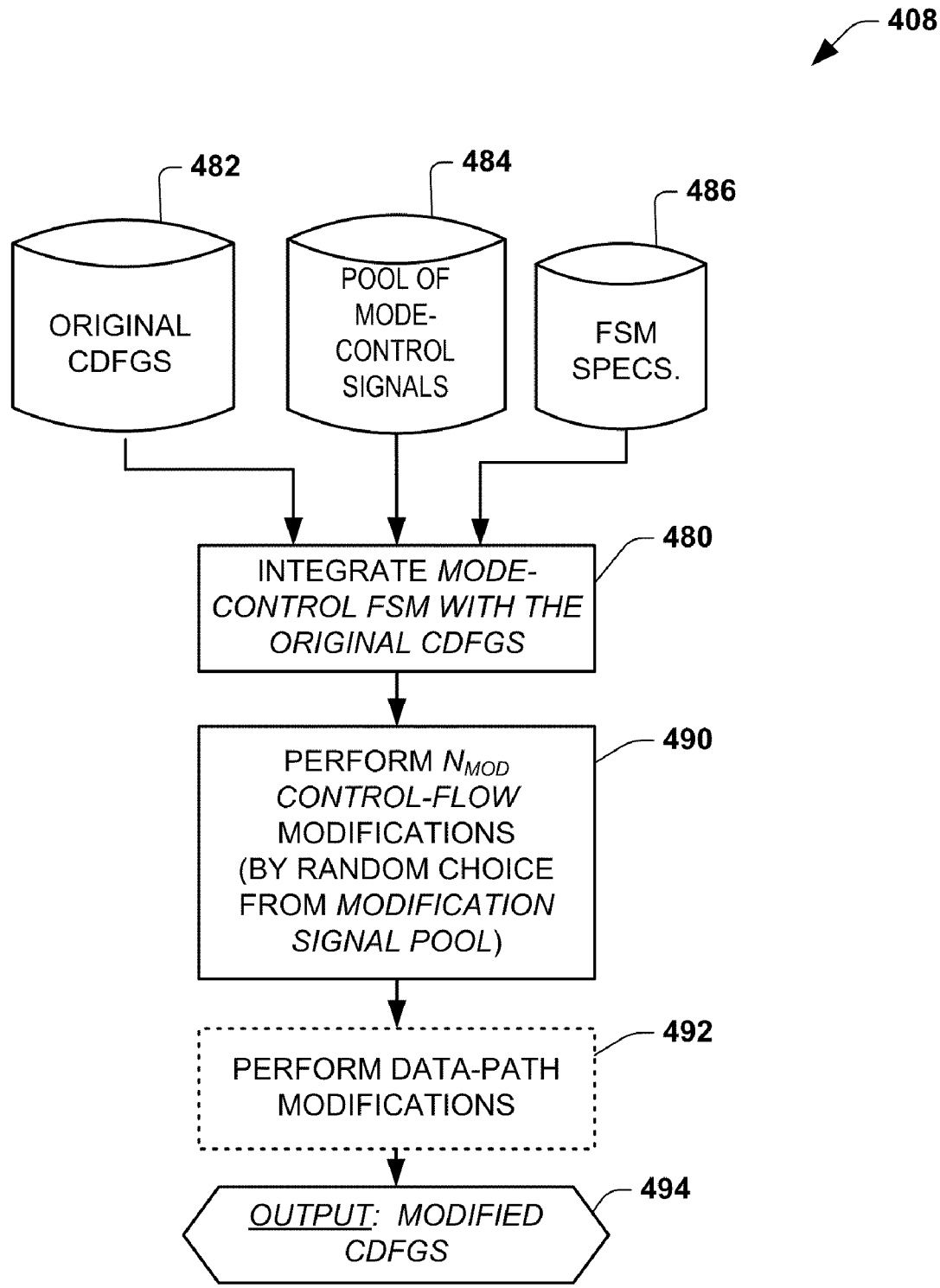
FIG. 19 is a flow diagram depicting an example obfuscation process that can be utilized as part of a RTL obfuscation method.

At 456, data-path components can be identified for modification as part of the obfuscation process (e.g., see 408 of FIG. 15 and FIG. 19). At 458, the number of modifications can be estimated as $N_{MOD}$. Once the estimate of $N_{MOD}$ has been determined, at 460, the method can output a set of original CDFGs transformed from RTL, and the estimated number of modifications $N_{MOD}$, which can be stored in memory. From the outputs at 460, the method 400 of FIG. 16 can continue to perform the obfuscation thereof.

FIG. 19 depicts an example of a method 408 for obfuscating a circuit design through modification of the CDFGs. For instance, the method 408 receives, as inputs, an original set of CDFGs (e.g., output from the analysis method 406 of FIG. 18) as well as a pool of mode control signals 484 and then an FSM specification 486 (e.g., as output by the mode-control FSM design method 404 of FIG. 17).

At 480, the mode-control FSM is integrated with the original CDFGs 482. At 490, flow control modifications are performed. The flow control modifications can be performed by modifying CDFG nodes using control signals generated from the FSM. There can be $N_{MOD}$ of such control-flow modifications. As an example, the largest CDFGs (e.g., having a greater number of nodes) can be selected for modification as it should enhance the maximum change in the functional behavior at a minimal design overhead.

In addition to the control flow modifications at 490, the method 408 can include performing data path modifications, as demonstrated at 492. For instance, the functionality of data path components can be changed by introducing additional data path elements. Such changes can be performed in a manner to help ensure sharing of additional resources during syntheses. This can be implemented to reduce overhead since data path components usually incur large hardware overhead.

Figure 22:
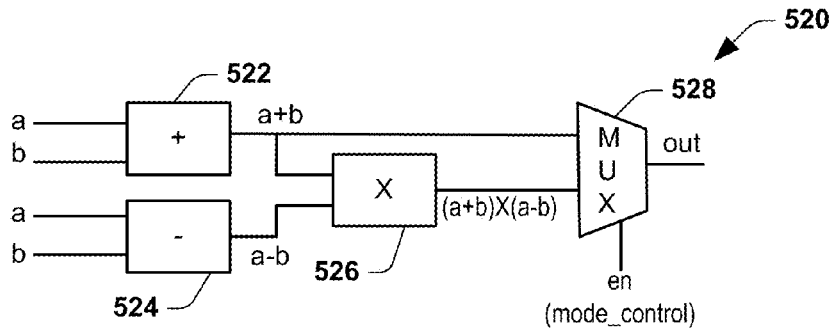
FIG. 22 depicts an example of logic demonstrating resource sharing in an obfuscated data path.

By way of example, FIG. 22 demonstrates a datapath 520 implementing resource sharing. The datapath includes an adder 522, a subtraction block 524, a multiplier 526 and a multiplexer 528. The original datapath (e.g., prior to obfuscation) included the adder 522, subtraction block 524 and the multiplier 526. Thus, in the example of FIG. 22, the datapath originally computed the output OUT as (a+b)*(a−b). After the modification of the RTL, the output OUT computes (a+b) when operating in the obfuscated mode, allowing the adder 522 to be shared in the two modes in which the output of the multiplier 526 and the adder 522 are to be multiplexed.

Returning to FIG. 19, the method 408 in turn provides its output at 494 that includes the modified set of CDFGs. From the modified CDFGs, a corresponding obfuscated RTL can be generated (e.g., corresponding to 412 in the method of 400 of FIG. 16).

Figure 23:
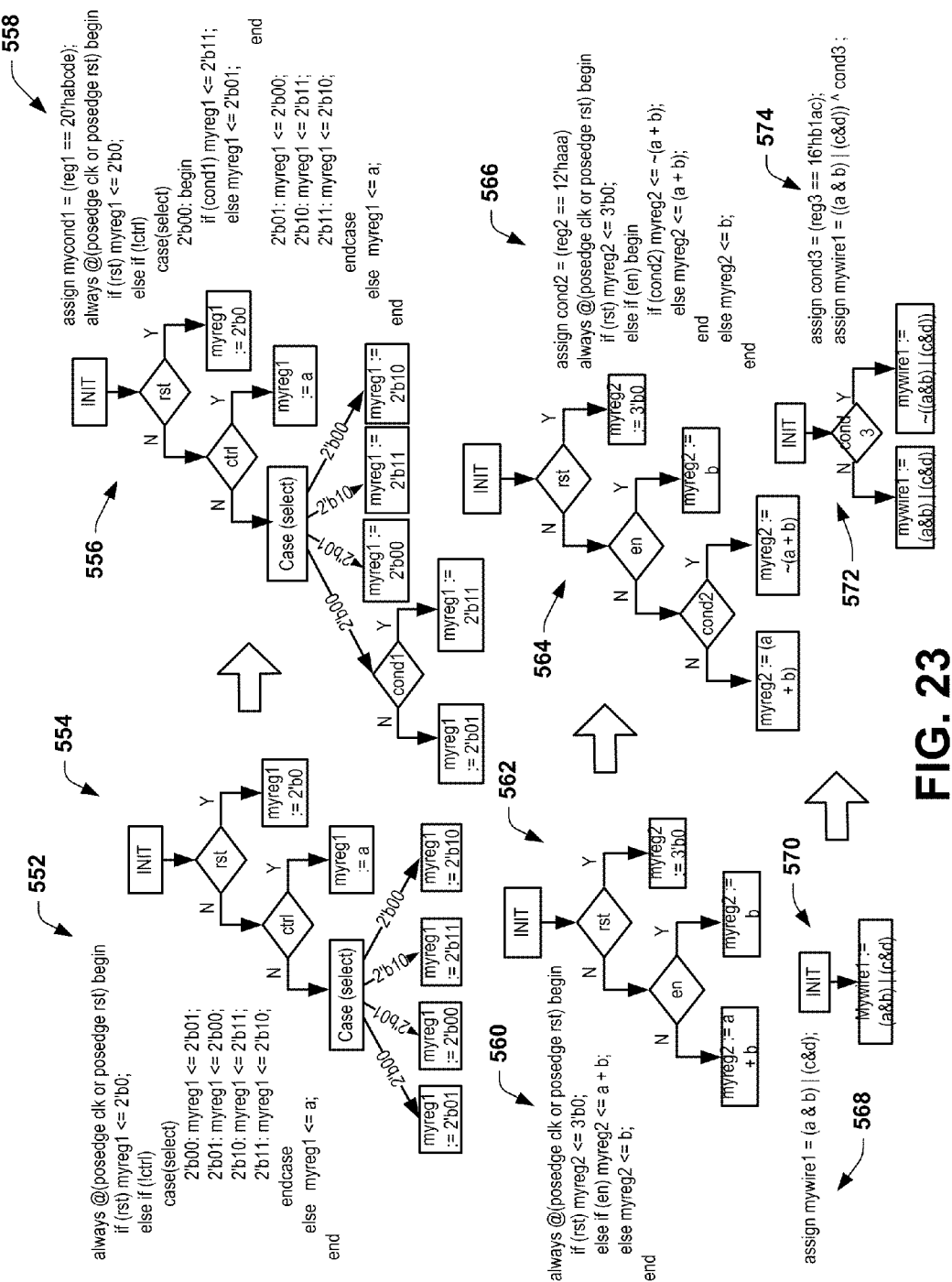
FIG. 23 depicts an example of original RTL and corresponding CDFGs being converted to respective obfuscated versions.

FIG. 23 demonstrates an example of control flow obfuscation, such as can be implemented at 490 of the method 408 of FIG. 19. In the example of FIG. 23, an original RTL 552 and its corresponding CDFG 554 are transformed to an obfuscated CDFG 556 and its associated RTL 558. Additionally, another original RTL 560 and its corresponding CDFG 562 are transformed to an obfuscated CDFG 564 and its associated RTL 566. Another original RTL 568 and its corresponding CDFG 570 are also demonstrated being transformed to an obfuscated CDFG 572 and its associated RTL 574. After the FSM has been hosted in a set of chosen host registers, several CDFG nodes are modified using the control signals generated from this FSM. The largest CDFGs are preferentially selected for modification, because this ensures maximum change in functional behavior at minimal design overhead. Two example modifications of the CDFGs and the corresponding RTL statements are shown in FIG. 23. The registers reg1, reg2 and reg3 are the host registers. Three "case( )", "if( )" and "assign" statements are modified by the mode-control signals cond1, cond2 and cond3, respectively. These signals evaluate to logic-1 only in the obfuscation mode because the conditions reg1=20'habcde, reg2=12'haaa and reg3=16'hblac correspond to states that only exist in the obfuscation mode.

FIG. 24 demonstrates an example of an obfuscated RTL 580 that can be generated from an original RTL 582 following obfuscation by modifying CDFGs (e.g., corresponding to 412-414 in the method of FIG. 16). For instance, the obfuscated RTL 580 can be generated from the modified CDFGs, by traversing each of them in a depth-first manner. In the example of FIG. 24, a four bit obfuscation FSM has been hosted in registers int reg1 and int reg2. The conditions int reg1[13:12]=2'b00, int reg1[13:12]=2'b01, int reg2[13:12]=2'b00 and int reg1[13:12]=2'b10 occur only in the obfuscated mode. The initialization sequence can be represented as follows:

in1=12'h654|in2=12'h222|in1=12'h333|in2=12'hacc→in1=12'9ab.

The example demonstrated in FIG. 24 also utilizes dummy state transitions and out-of-order state transition RTL statements to increase the level obfuscation with reduced overhead. The outputs res1 and res2 have been modified by two different modification signals. Instead of allowing the inputs to appear directly in the sensitivity list of the "if( )" statements, it is possible to derive internal signals (similar to the ones shown in the obfuscated RTL 580) with complicated Boolean expressions that are used to perform the modifications. The output res1 has been modified following the datapath modification approach using resource sharing (see, e.g., 492 of FIG. 19 and related description of FIG. 21).

Figure 25:
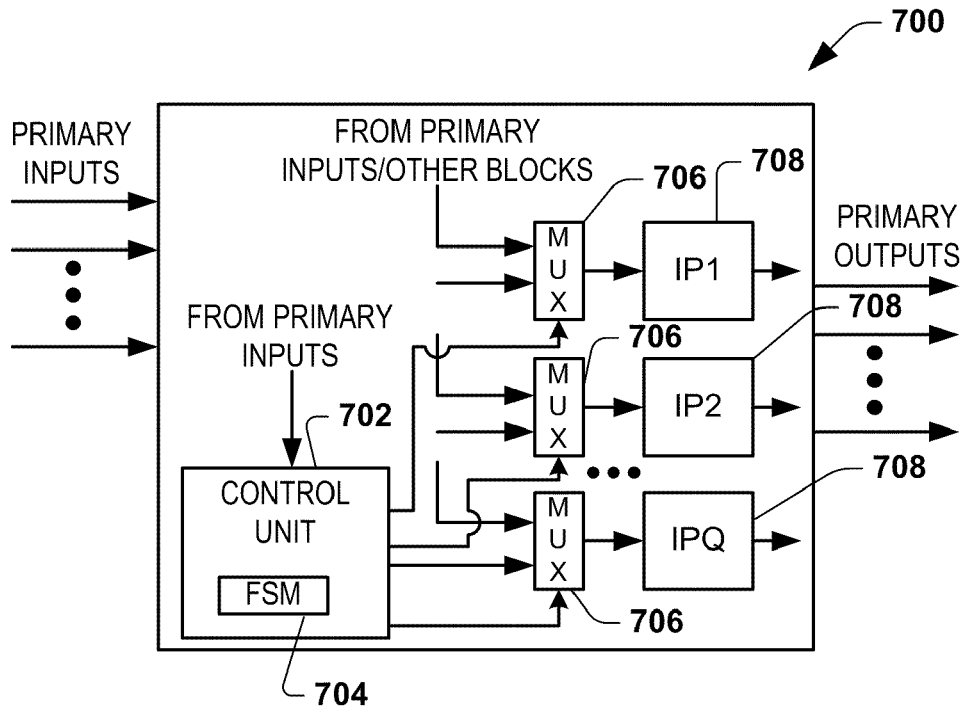
FIG. 25 depicts an example of an obfuscated system.
Figure 26:
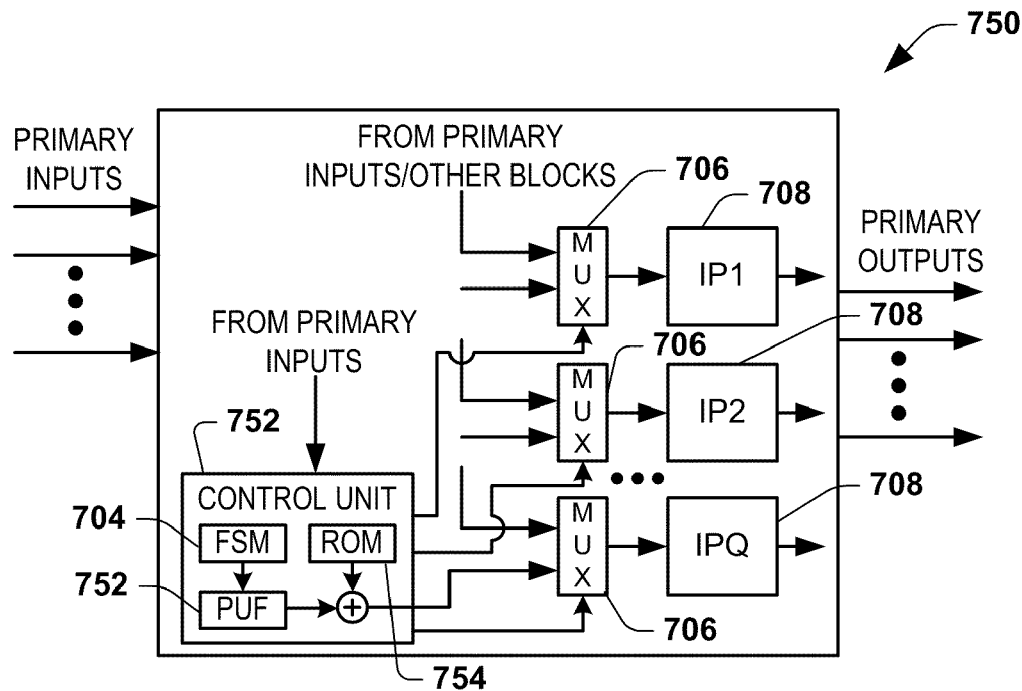
FIG. 26 depicts another example of an obfuscated system.

FIGS. 25 and 26 depict example SoC blocks 700 and 750 that can be generated. Each of the SoC blocs 700 and 750 includes a set of primary inputs and primary outputs that vary based on the contents of the SoC and whether it operates in a normal operating mode or an obfuscated mode.

In FIG. 25, the SoC block 700 includes a control unit (or controller) 702 that has been modified to include a sequential structure, such as an FSM 704. The FSM 704 can be configured to implement one or more obfuscation state machines or Trojans based on the teachings herein. In the example of FIG. 25, the control unit 702 provides outputs to each of a plurality of Q multiplexers 706 (Q is a positive integer, Q>1). The respective outputs to each multiplexer 706 can be the same or different. Each multiplexer 706 provides a corresponding output to a respective IP block 708 of the SoC 700 based on a control signal from the control unit 702. The SoC 700 provides corresponding primary outputs based on the operation of the IP blocks 708 under the control of the control unit 702.

By way of example, by constructing the SoC 700 according to a secure SoC design flow, such as disclosed herein, all concerned with the electronic design and manufacturing process can benefit. For instance, the IP vendor applies the hardware obfuscation scheme to create the modified IP and supplies it to the design house, along with one or more keys. The design house receives one or multiple IPs from the IP vendors and integrates them onto the SoC 700. To activate the different IPs 708, which incorporate obfuscated circuitry, as disclosed herein, the designer includes a low-overhead controller in the SoC for providing appropriate keys to the IPs 708. In the example of FIG. 25, the control unit is configured to perform the initialization of the different IP blocks 708, such as by serially steering the different initialization sequences to the different IP blocks from the primary inputs. This controller module has an integrated FSM which determines the steering of the correct input sequences in correct order to a specific IP block. Multiplexors 706 can be controlled by the FSM 704 to steer initialization sequences to the IP blocks during initialization, or the primary inputs or internal signals during normal operation. The chip designer can modify the test-benches accordingly to perform block-level or chip-level logic simulations.

The example SoC of FIG. 26 is similar to FIG. 25, such that like reference characters in FIG. 26 are used to indicate parts previously introduced with respect to FIG. 25. Accordingly reference can be made back to the example of FIG. 25 for a description of such elements. In the example of FIG. 26, the control unit 702 includes an FSM 704, similar to FIG. 25, but also includes a physically unclonable function (PUF) block 752 and a programmable memory (e.g., a programmable ROM) 754. In this example, the initialization sequences stored can be stored permanently on-chip in the memory 754.

For example, the activating patterns can be implemented as simple logic function (e.g., an XOR) of the patterns read from the memory 754 and the output of the PUF block 752. The patterns can be written to the memory 754 post-manufacturing, such as after receiving instructions from the chip designer. Because the output of a PUF circuit is not predictable before manufacturing, it is not possible to have the same bits written into the programmable ROMs for each IC instance. At the beginning of operations, the control unit 752 reads the different input sequences in parallel and sends them to the different IP blocks for initialization. An advantage of this approach is that the number of initialization cycles can be limited. However, an extra overhead is incurred for storing the input sequences on an on-chip ROM. Again, to increase the security of the scheme, the chip designer can arrange an instance-specific initialization sequence to be stored on the memory 754.

Figure 27:
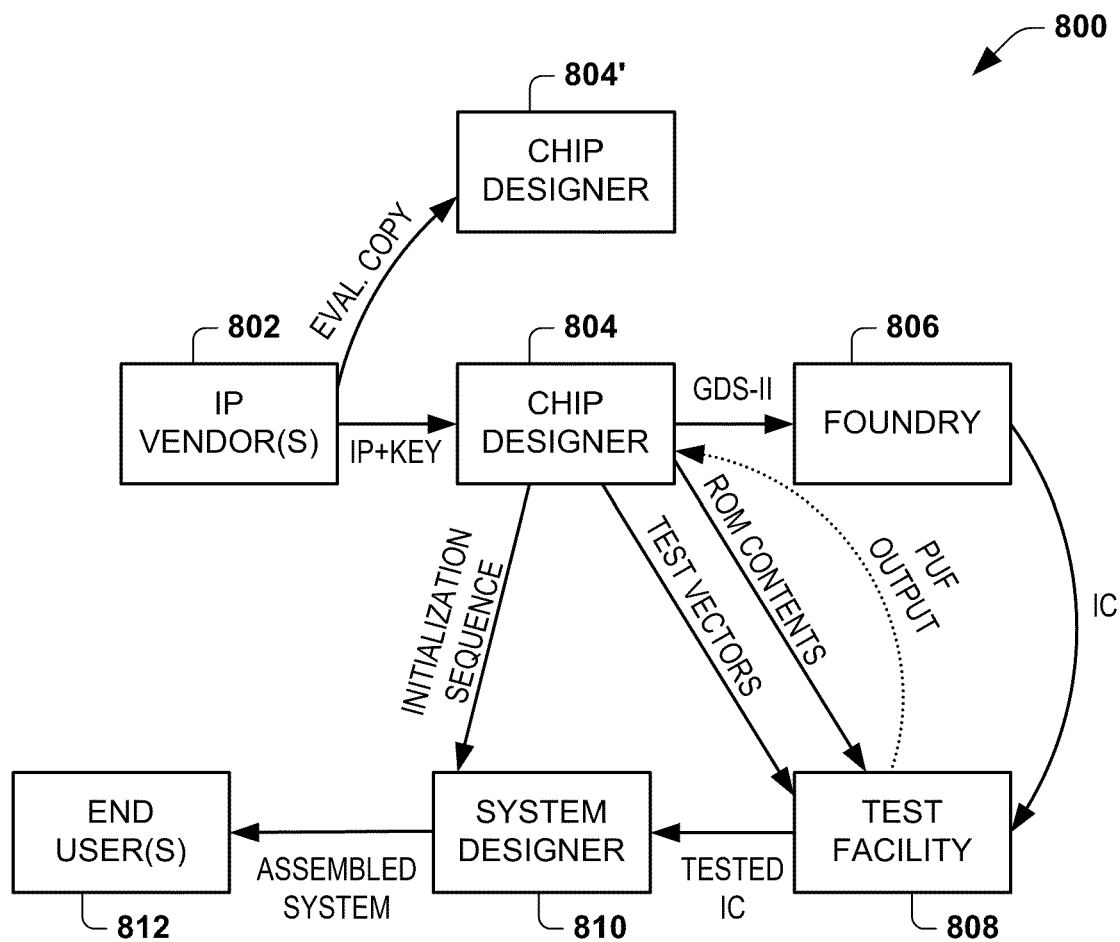
FIG. 27 is an example of a design flow that can utilize protection through obfuscation systems and methods at various stages of the IP lifecycle.

FIG. 27 depicts an example design flow 800 in which the methods and systems disclosed herein can be employed to provide protection throughout the flow. Briefly, the design flow 800 includes one or more IP vendors 802 that generate the IPs and associated keys. The IP vendors 802 can provide the IPs and associated keys to a chip designer 804. The chip designer 804 can provide a representation of the chip design (incorporating any number of IPs) to a foundry 806, such as a manufacturing house. For example, the chip designer can provide the design in a Graphic Database System format, such as according to the GDS II stream format. The foundry 806 can use the data to reconstruct all or part of the artwork to be used in sharing layouts, transferring artwork between different tools, or creating photomasks.

Additionally, another chip designer 804' can obtain an evaluation version of the IP from a vendor 802. The evaluation version can include an embedded sequential structure configured to operate as Trojan, as disclosed herein (see, e.g., FIGS. 11-13 and corresponding description). Thus, the designer 804' can evaluate the evaluation version of the IP for probabilistically determined time. Since the IP includes the Trojan, as disclosed herein, the evaluation version can be distributed freely (e.g., without license or execution of an agreement), such as for downloading via the Internet, without concern of the IP being compromised. If the designer 804' desires to purchase the IP, he can purchase the disabling key from the vendor 802.

The foundry 806 fabricates the chip based on the design data from the designer and provides the chip to a test facility 808. The chip designer 804 can also provide the test facility 808 with test data, such as test vectors. If the chip incorporates an SoC, such as demonstrated in FIG. 26, the chip designer 804 can also provide the test facility with data for programming the memory 754 with one or more keys to enable operation of the circuitry. For instance, the chip designer can calculate the specific bits required to be written in the one-time programmable memory. The test facility 808 programs the memory, and blows off a one-time programmable fuse, so that the output of the PUF block is no longer visible at the output. The test facility 808 then performs post-manufacturing testing, using the set of test vectors provided by the design house. If a PUF block has been used in the IC, the test engineer can report the output on the application of certain vectors back to the chip designer 804.

The test facility 808 can provide a tested IC to a system designer 810 for incorporating the tested IC into a corresponding system or device. To enable operation of the IC in the system or device, the chip designer 804 provides the system designer 810 with the appropriate keys to enable operation of the IC. For example, the system designer 810 can integrate one or more different ICs in the board-level design and configure to apply the initialization keys during "booting" or similar other initialization phase. Thus, the initialization patterns for the different SoCs can be stored in memory, such as ROM. In most ASICs composed of multiple IPs, several initialization cycles are typically needed at start-up to get into the "steady-stream" state, which requires accomplishing certain tasks such as initialization of specific registers. The system designer 810 can easily utilize this inherent latency to hide the effect of the initialization sequences from the end user. The system designer 810 in turn benefits from the fact that the board is unusable until the correct initialization patterns have been stored in the ROM.

Finally, this secure assembled system is provided to an end user 812, such as in a consumer product for which it is intended. The obfuscation techniques provide the end-user with the assurance that the components have gone through a secure and piracy-proof design flow. Ideally, all communication between parties associated with the design flow should be carried out in an encrypted form, such as using symmetric or asymmetric cryptographic algorithms. As disclosed herein, the design flow has various benefits at each level of design and manufacture.

What have been described above are examples and embodiments of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications and variations that fall within the scope of the appended claims and the application.

What is claimed is:

1. A method for protecting an integrated circuit chip design, comprising:
    storing in memory an original circuit description of an integrated circuit core comprising a set of nodes;
    selecting a plurality of modification nodes from the set of nodes;
    inserting a sequential structure into the original circuit description to provide a modified circuit description, the plurality of modification nodes operating as inputs to the sequential structure, the modified circuit description corresponding to an obfuscated version of the original circuit description that enables at least an evaluation of the original circuit description; and
    storing the modified circuit description in memory, wherein the modified circuit description is functionally equivalent to an original circuit description upon application of the key.

2. The method of claim 1, wherein the modified circuit description comprises a firm intellectual property (IP) instance, the method further comprising converting the firm IP instance description to a soft IP instance.

3. The method of claim 2, wherein the soft IP unit comprises a register-transfer level circuit description.

4. The method of claim 2, wherein the converting further comprises:
    synthesizing the modified circuit description to intermingle state elements of the firm IP instance with state elements of the modified circuit description; and
    de-compiling the synthesized description to remove redundant nodes and provide a functionally and semantically obfuscated soft IP instance.

5. The method of claim 1, wherein the original circuit description comprises a soft intellectual property (IP) instance, the method further comprising transforming the soft IP instance into a corresponding control and data flow graph (CDFG) data structure, the CDFG data structure being obfuscated by insertion of the sequential structure into the CDFG data structure.

6. The method of claim 5, wherein the sequential structure comprises a finite state machine having state elements, wherein insertion of the sequential structure further comprises:
    expanding an original register structure of the soft IP instance of the original circuit description; and
    hosting at least one of the state elements of the finite state machine in the expanded original register structure.

7. The method of claim 6, wherein the original register structure comprises a plurality of states, at least some of the plurality of states of the original register structure being unused states, the insertion of the sequential structure further comprising:
    identifying the unused states of the original register structure; and
    using the identified unused states to conform to at least one state of the finite state machine; and
    modifying logic in the original circuit description to implement transitions between states of the finite state machine.

8. The method of claim 6, further comprising modifying the CDFG data structure based on control signals generated from the hosted state element of the finite state machine.

9. The method of claim 5, further comprising converting the obfuscated CDFG data structure to provide an obfuscated soft IP instance of the original circuit description.

10. The method of claim 1, wherein the sequential structure comprises a mode-control finite state machine configured to operate the integrated circuit chip design in one of an obfuscated mode and a normal operating mode depending on application of a key sequence of the key, whereby protection against reverse engineering and cloning is provided.

11. The method of claim 10, wherein the mode-control finite state machine is designed to provide an output that varies according to a set of generated Boolean functions, which in the obfuscated mode defines a digital watermark for the obfuscated version of the circuit description.

12. The method of claim 10, wherein the mode-control finite state machine is configured to operate in the obfuscated mode initially at power up, such that normal operation of the integrated circuit chip design is disabled, and change from the obfuscated mode to the normal mode in response to an initialization key sequence being provided at a set of primary inputs.

13. The method of claim 10, wherein the mode-control finite state machine is configured to operate in the normal mode after power up and change from the normal mode to the obfuscated mode, such that normal operation of the circuit is disabled, after a predetermined time based on an activation key sequence at the selected plurality of modufication nodes within the modified circuit description, whereby evaluation of the original circuit description is permitted for the predetermined time.

14. The method of claim 13, wherein the mode-control finite state machine is configured to disable the obfuscated mode in response to providing a disabling sequence at the primary inputs.

15. The method of claim 10, wherein the mode-control finite state machine is configured to perform dummy state transitions in each of the obfuscated mode and the normal operating mode.

16. The method of claim 10, further comprising sharing the key between authorized parties involved in a design flow for fabricating a device that comprises the modified circuit description.

17. The method of claim 10, wherein the mode-control finite state machine is configured to operate in the normal operating mode and change from the normal operating mode to an invalid operating mode after a predetermined sequence of state transitions occurs within the modified circuit description, wherein normal expected functionality of the integrated circuit chip design is disabled in the invalid operating mode.

18. The method of claim 1, wherein the original circuit description comprises a gate-level netlist stored in the memory, the sequential structure comprises a finite state machine, the finite state machine being inserted into the gate-level netlist by modifying the gate-level netlist and storing the modified gate-level netlist in memory.

19. The method of claim 1, wherein the modified circuit description comprises one or more of a gate-level netlist, a Register-Transfer Level (RTL) instance, and a control and data flow graph (CDFG) data structure.

20. A method for protecting an integrated circuit chip design, comprising:
    storing in memory a circuit description of an integrated circuit core comprising a set of nodes;
    selecting a plurality of modification nodes from the set of nodes, wherein selecting the plurality of modification nodes further comprises:
    calculating a node selection metric for each internal node in the set of nodes; and
    ranking the set of nodes in an order based on calculated node selection metrics;
    inserting a sequential structure into the circuit description to provide a modified circuit description, the plurality of modification nodes operating as inputs to the sequential structure; and
    storing the modified circuit description in memory, whereby the modified circuit description affords protection throughout a design flow.

21. The method of claim 20, wherein the node selection metric is calculated as a function of at least one of fan-in characteristics and fan-out characteristics for each respective node.

22. The method of claim 20, wherein the ranking is performed according to a multi-pass approach that affords greater weight to nodes having non-overlapping fan-out characteristics so as to increase the structural difference between the original and obfuscated circuit design.

23. A system for protecting an integrated circuit design comprising:
    a node selector programmed to select a plurality of modification nodes from a set of nodes in an original circuit design; and
    an obfuscation tool programmed to modify the original circuit design by inserting a sequential structure into the original circuit design to provide an obfuscated circuit description that is stored in memory, the obfuscated circuit description operating in an obfuscated mode in the absence of applying a key and a normal mode upon application of a key at nodes of the obfuscated circuit.

* * * * *